(12) United States Patent
Yoo et al.

(10) Patent No.: US 12,382,184 B2
(45) Date of Patent: Aug. 5, 2025

(54) DISPLAY DEVICE AND METHOD OF DRIVING THE SAME

(71) Applicant: Samsung Display Co., Ltd., Yongin-si (KR)

(72) Inventors: Jewon Yoo, Seoul (KR); Daewook Kim, Hwaseong-si (KR); Seungin Baek, Seongnam-si (KR); Jaebum Cho, Seoul (KR); Sang-Gu Lee, Yongin-si (KR); Hyung Uk Cho, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 393 days.

(21) Appl. No.: 17/751,527

(22) Filed: May 23, 2022

(65) Prior Publication Data

US 2022/0394193 A1 Dec. 8, 2022

(30) Foreign Application Priority Data

Jun. 2, 2021 (KR) .......................... 10-2021-0071612

(51) Int. Cl.
*H04N 23/76* (2023.01)
*H04N 23/57* (2023.01)
*H04L 65/403* (2022.01)

(52) U.S. Cl.
CPC ............. *H04N 23/76* (2023.01); *H04N 23/57* (2023.01); *H04L 65/403* (2013.01)

(58) Field of Classification Search
None
See application file for complete search history.

(56) References Cited

U.S. PATENT DOCUMENTS 9,183,813 B2 * 11/2015 Chirde ................... G06F 3/147
9,842,549 B2    12/2017 Musgrave et al.
(Continued)

FOREIGN PATENT DOCUMENTS

KR    10-2018-0122548 A    11/2018
KR    10-2019-0035358 A    4/2019
(Continued)

OTHER PUBLICATIONS

Sarah Frances Safranek, A Comparison of Techniques Used for the Removal of Lens Flare Found in High Dynamic Range Luminance Measurements, B.S., University of Colorado Boulder, 2015, 99 pages.
(Continued)

*Primary Examiner* — Duc Nguyen
*Assistant Examiner* — Assad Mohammed
(74) *Attorney, Agent, or Firm* — Womble Bond Dickinson (US) LLP

(57) ABSTRACT

A display device includes: a display panel including a first display area having a first light transmittance and a second display area having a second light transmittance that is higher than the first light transmittance; a camera module under the second display area that is configured to output a raw image signal; a compensation module configured to: activate in response to a compensation control signal; receive the raw image signal; and compensate the raw image signal through a compensation program utilizing a learning data-based deep learning algorithm to generate a compensation image signal; and a control module configured to control operations of the display panel, the camera module, and the compensation module.

24 Claims, 35 Drawing Sheets

(56) References Cited

U.S. PATENT DOCUMENTS

| | | | |
|---|---|---|---|
| 10,776,904 B2 | 9/2020 | Petrova et al. | |
| 11,039,074 B1* | 6/2021 | Manzari | G06F 3/04847 |
| 2008/0055228 A1* | 3/2008 | Glen | G09G 3/3406 |
| | | | 345/102 |
| 2009/0225176 A1* | 9/2009 | Honjo | G03B 5/02 |
| | | | 348/E5.022 |
| 2013/0162749 A1* | 6/2013 | Eskilsson | H04N 7/144 |
| | | | 348/14.1 |
| 2015/0334533 A1* | 11/2015 | Luo | H04W 4/021 |
| | | | 455/406 |
| 2015/0363919 A1* | 12/2015 | Suri | G06T 5/92 |
| | | | 382/172 |
| 2017/0070779 A1* | 3/2017 | Kim | H04N 21/8549 |
| 2020/0169680 A1 | 5/2020 | Park et al. | |
| 2020/0211480 A1* | 7/2020 | Xiang | G09G 3/3406 |
| 2020/0280668 A1 | 9/2020 | Park et al. | |
| 2020/0375005 A1* | 11/2020 | Gu | G03B 15/03 |
| 2021/0125066 A1* | 4/2021 | Lazovich | G06N 20/10 |
| 2022/0208142 A1* | 6/2022 | Yang | H04N 23/74 |

FOREIGN PATENT DOCUMENTS

| | | | | |
|---|---|---|---|---|
| KR | 10-2020-0060118 A | 5/2020 | | |
| WO | WO-2021041125 A1 * | 3/2021 | | A61B 6/037 |

OTHER PUBLICATIONS

Kyoung Sil Kim, Deep Learning and Knowledge Distillation based Flare Detection for Camera Module Inspection, IWHA University, 2020, 60 pages.

* cited by examiner

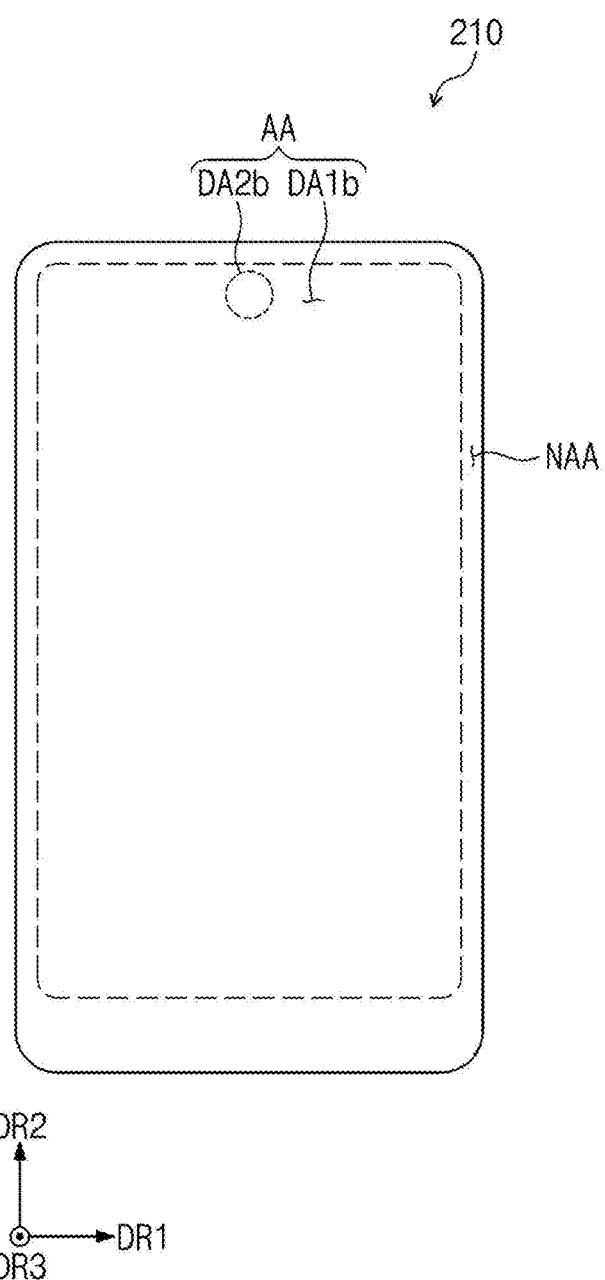

DISPLAY DEVICE AND METHOD OF DRIVING THE SAME

CROSS-REFERENCE TO RELATED APPLICATION

The present application claims priority to and the benefit of Korean Patent Application No. 10-2021-0071612 filed on Jun. 2, 2021, in the Korean Intellectual Property Office, the entire disclosures of which is incorporated herein by reference.

BACKGROUND

Aspects of some embodiments of the present disclosure described herein relate to a display device and a driving method of the display device.

A display device may be a device including various electronic components such as a display panel that displays images, an input sensing unit that senses an external input, and an electronic module. The electronic components may be electrically connected to one another by variously arranged signal lines. The display panel includes a light emitting element that generates light.

The input sensing unit may include sensing electrodes for sensing an external input. The electronic module may include a camera, an infrared sensor, a proximity sensor, etc. The electronic module may be arranged under the display panel.

The above information disclosed in this Background section is only for enhancement of understanding of the background and therefore the information discussed in this Background section does not necessarily constitute prior art.

SUMMARY

Aspects of some embodiments of the present disclosure described herein relate to a display device and a driving method of the display device, and for example, relate to a display device including a camera module and a driving method of the display device.

Aspects of some embodiments of the present disclosure include a display device capable of improving a quality of an image acquired by a camera module provided under a display area of the display device, and a method of driving the same.

According to some embodiments of the present disclosure, a display device includes a display panel, a camera module, a compensation module, and a control module. The display panel includes a first display area having a first light transmittance and a second display area having a second light transmittance higher than the first light transmittance. The camera module is under the second display area and outputs a raw image signal. The compensation module is activated in response to a compensation control signal, receives the raw image signal, and compensates the raw image signal through a compensation program utilizing a learning data-based deep learning algorithm to generate a compensation image signal. The control module controls operations of the display panel, the camera module, and the compensation module.

According to some embodiments of the present disclosure, in a driving method of a display device, the display device includes a display panel and a camera module. The display panel includes a first display area having a first light transmittance and a second display area having a second light transmittance higher than the first light transmittance. The camera module is under the second display area and outputting a raw image signal. The method of driving the display device includes activating a compensation application in which a compensation program is stored, providing the raw image signal to the activated compensation application, generating a compensation image signal by compensating the raw image signal through the compensation program utilizing a learning data-based deep learning algorithm in the compensation application, and displaying a compensation image corresponding to the compensation image signal on the display panel.

According to some embodiments of the present disclosure, in a driving method of a display device, the display device includes a display panel and a camera module. The display panel includes a first display area having a first light transmittance and a second display area having a second light transmittance higher than the first light transmittance. The camera module is under the second display area and outputting a raw image signal. The method of driving the display device includes transmitting the raw image signal to a server through a network, receiving, from the server, a compensation image signal generated by compensating the raw image signal through a compensation program utilizing a learning data-based deep learning algorithm, and displaying a compensation image corresponding to the compensation image signal on the display panel.

BRIEF DESCRIPTION OF THE FIGURES

The above and other characteristics and features of the present disclosure will become more apparent by describing in more detail aspects of some embodiments thereof with reference to the accompanying drawings.

FIGS. 3A to 3D are plan views of a display panel according to some embodiments of the present disclosure.

DETAILED DESCRIPTION

Figure 1A:
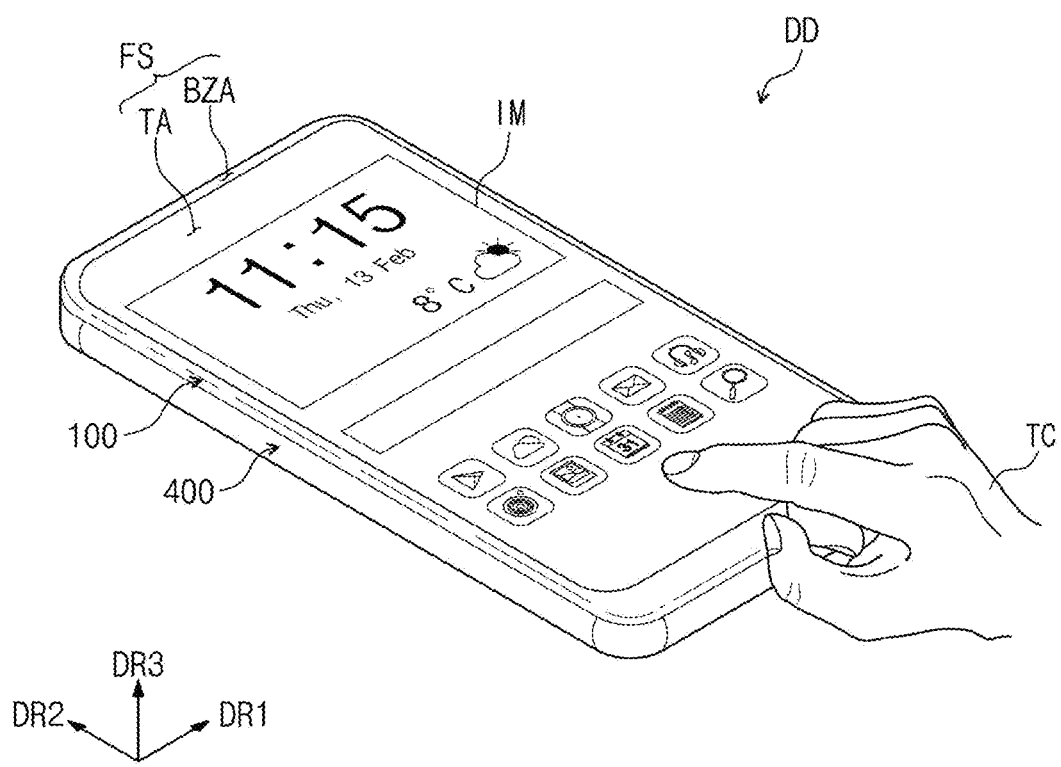
FIG. 1A is a perspective view of a display device according to some embodiments of the present disclosure.

Hereinafter, aspects of some embodiments of the present disclosure will be described in more detail with reference to the accompanying drawings. Because the embodiments according to the present disclosure can have various changes and can have various forms, specific embodiments are illustrated in the drawings and described in more detail in the text. However, this is not intended to limit embodiments according to the present disclosure to the specific disclosed form, and it should be understood to include all modifications, equivalents and substitutes included in the spirit and scope of embodiments according to the present disclosure.

In describing each drawing, like reference numerals refer to like components. In the accompanying drawings, the dimensions of structures are exaggerated than the actual size for clarity of the present disclosure. The terms such as "first", "second", etc. are used to describe various components, but the components are not limited by the terms. The above terms are used only to differentiate one component from another component. For example, a first component may be named as a second component, and vice versa, without departing from the scope of the present disclosure. A singular form, unless otherwise stated, includes a plural form.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

In this application, when a part of a layer, film, area, plate, etc. is said to be "on" or "above" another part, this includes not only cases where it is "right above" another part, but also cases where there is another part in between. Conversely, when a part of a layer, film, area, plate, etc. is said to be "under" or "below" another part, this includes not only cases where it is "just under" another part, but also cases where there is another part in between. In addition, in the present application, the term "on" may include the case of being located not only on the upper part but also on the lower part.

Meanwhile, in the present application, the term "directly in contact" may mean that there is no layer, film, area, plate, etc. added between a part of a layer, a film, an area, a plate, etc. and another part. For example, the term "directly in contact" may mean forming two members without using an additional member such as an adhesive member.

Hereinafter, a display device according to some embodiments of the present disclosure will be described in more detail with reference to accompanying drawings.

Figure 1B:
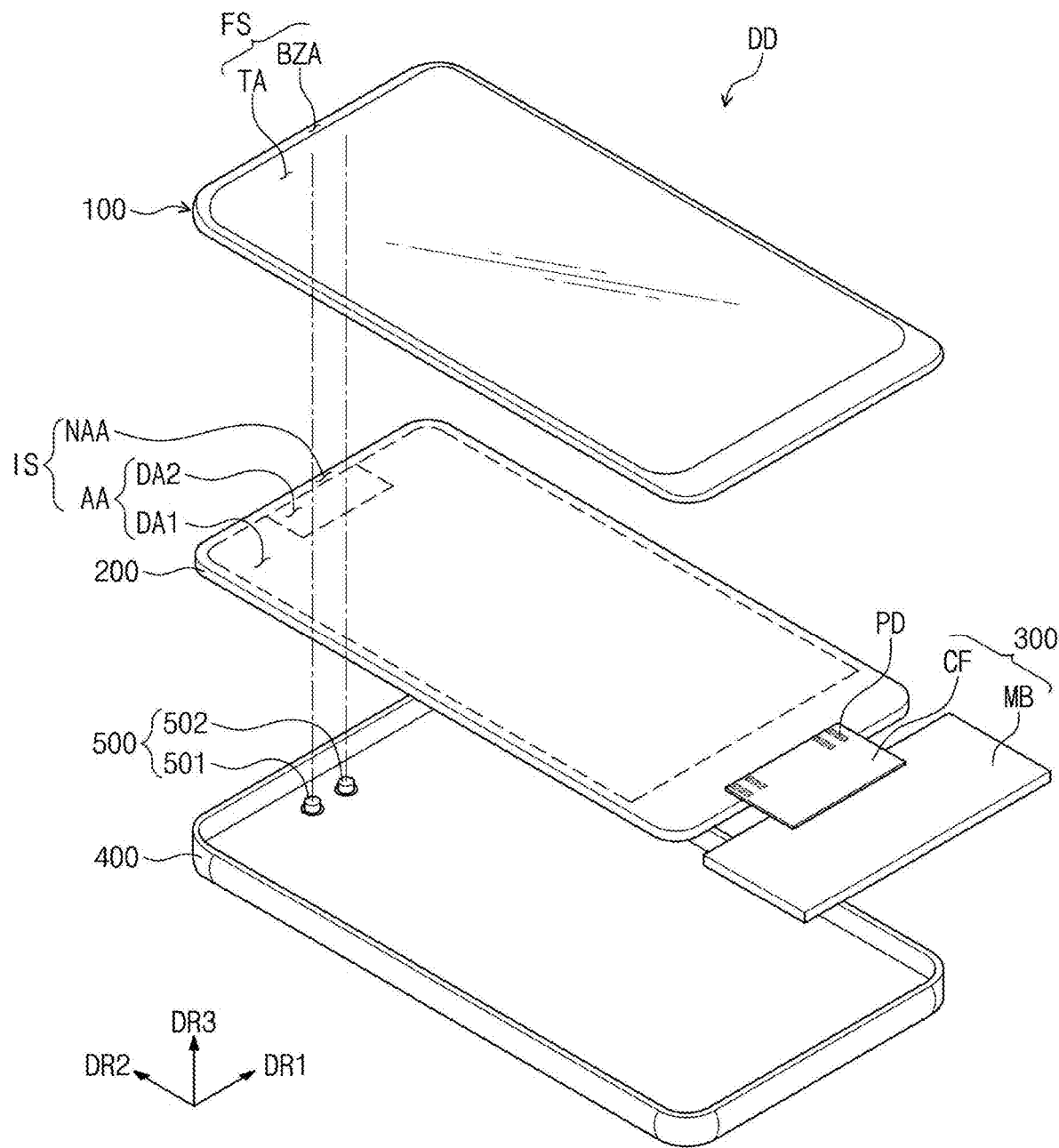
FIG. 1B is an exploded perspective view of a display device according to some embodiments of the present disclosure.
Figure 2:
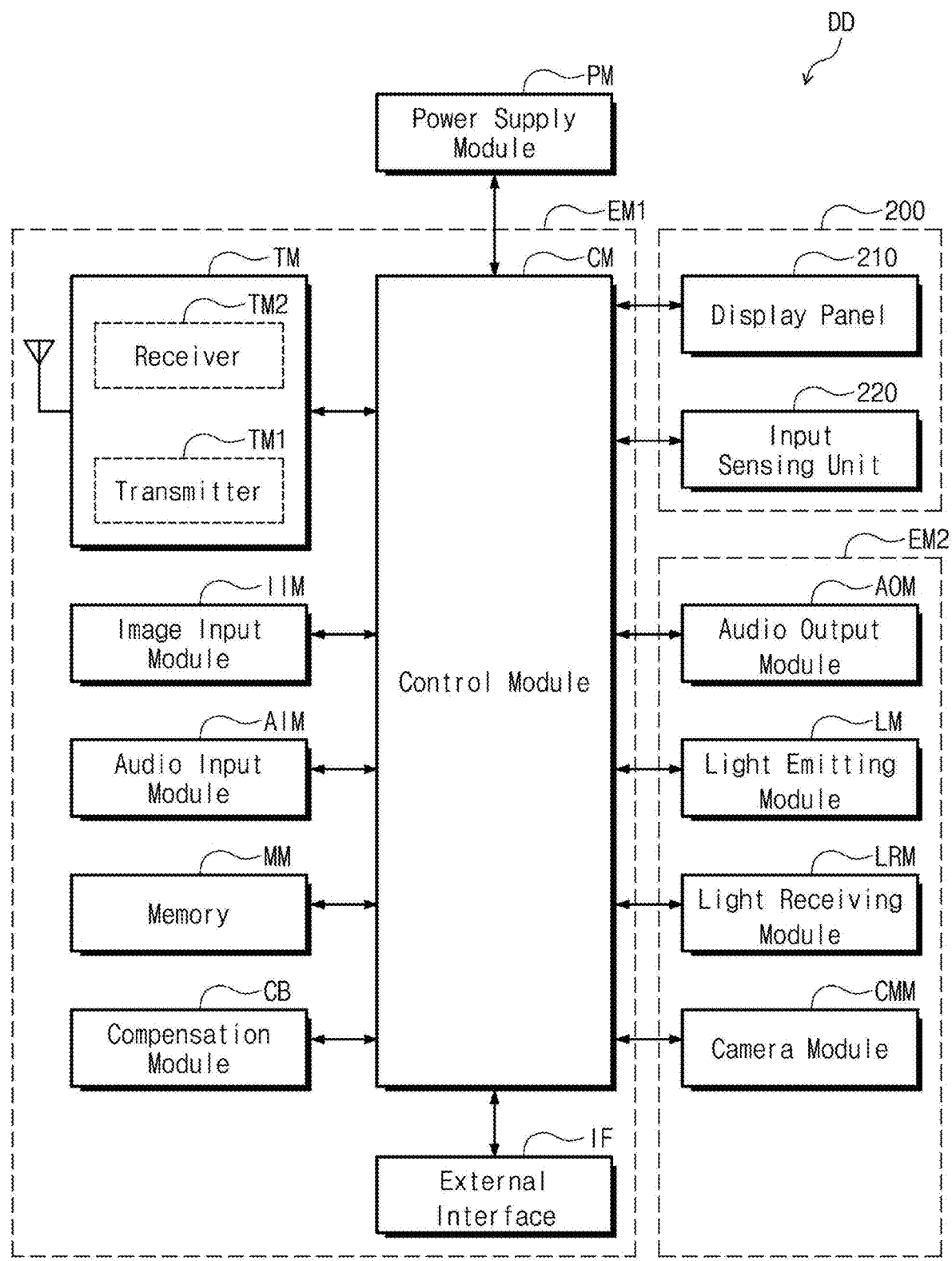
FIG. 2 is a block diagram of a display device according to some embodiments of the present disclosure.

FIG. 1A is a perspective view of a display device according to some embodiments of the present disclosure. FIG. 1B is an exploded perspective view of a display device according to some embodiments of the present disclosure. FIG. 2 is a block diagram of a display device according to some embodiments of the present disclosure.

Referring to FIGS. 1A to 2, a display device DD may have a rectangular shape having long sides in a first direction DR1 and short sides in a second direction DR2 crossing the first direction DR1. In some embodiments, the second direction DR2 may be perpendicular to the first direction DR1. However, embodiments according to the present disclosure are not limited thereto, and the display device DD may have various shapes, such as a circular shape and a polygonal shape.

The display device DD may be a device activated depending on an electrical signal. The display device DD may include various embodiments. For example, the display device DD may be applied to electronic devices such as a smart phone, a smart watch, a tablet, a notebook computer, a computer, a smart television, etc. According to some embodiments, the display device DD is illustrated as being a smart phone.

A direction actually perpendicular or normal with respect to a plane defined by the first direction DR1 and the second direction DR2 is defined as a third direction DR3. In the present specification, the term "when viewed in a plane" or "in a plan view" may refer to a state viewed from the third direction DR3.

An upper surface of the display device DD may be defined as a display surface FS, and may be parallel to a plane defined by the first direction DR1 and the second direction DR2. Images IM generated by the display device DD may be provided or displayed to a user through the display surface FS.

The display device DD may include a window 100, a display module 200, a driving circuit unit 300, a housing 400, and lower electronic modules 500. According to some embodiments, the window 100 and the housing 400 may be combined to form an exterior of the display device DD.

The window 100 may include an optically transparent insulating material. For example, the window 100 may include glass or plastic. The window 100 may have a multi-layer structure or a single-layer structure. For example, the window 100 may include a plurality of plastic films bonded with an adhesive, or a glass substrate and a plastic film that are bonded with an adhesive.

On a plane, the window 100 may be divided into a transmission area TA and a bezel area BZA. The bezel area BZA may be located outside a footprint or in a periphery of the transmission area TA. In the present specification, the meaning of "on a plane" may refer to a case of looking in the third direction DR3. Also, the "thickness direction" may refer to the third direction DR3.

The transmission area TA may be an optically transparent area. The bezel area BZA may be an area having a relatively low light transmittance compared to the transmission area TA. The bezel area BZA may define a shape of the transmission area TA. The bezel area BZA may be adjacent to the transmission area TA and may surround the transmission area TA. However, this is illustrated by way of example, and the bezel area BZA may be located adjacent to only one side of the transmission area TA or may be omitted.

The display module 200 may be located under the window 100. In this specification, the term "under" may mean a direction opposite to the third direction DR3 in which the display module 200 provides an image. The display module 200 may display the image IM and may sense a user's input TC. The display module 200 includes a front surface IS including an active area AA and a peripheral area NAA. The active area AA may be an area activated depending on an electrical signal.

According to some embodiments, the active area AA may be an area in which the image IM is displayed, and may also be an area in which the user's input TC is sensed. The transmission area TA overlaps at least the active area AA. For example, the transmission area TA overlaps the entire surface or at least a portion of the active area AA. Accordingly, the user may recognize the image IM through the transmission area TA or provide the user's input TC.

The peripheral area NAA is adjacent to the active area AA. The peripheral area NAA may surround the active area AA. A driving circuit or a driving line for driving the active area AA may be located in the peripheral area NAA. The peripheral area NAA may be an area covered by the bezel area BZA. The bezel area BZA may cover the peripheral area NAA of the display module 200 to block the peripheral area NAA from being viewed from the outside.

According to some embodiments, the display module 200 may be coupled to the window 100 in a state in which the active area AA and the peripheral area NAA are flat. However, this is illustrated by way of example, and a portion of the peripheral area NAA may be coupled to the window 100 in a curved shape. Alternatively, a portion of the active area AA may also be coupled to the window 100 in a curved shape. Alternatively, in the display module 200 according to some embodiments of the present disclosure, the peripheral area NAA may be omitted.

The active area AA of the display module 200 may include a plurality of display areas. The plurality of display areas may have different light transmittances. As an example, the active area AA of the display module 200 includes a first display area DA1 and a second display area DA2. The second display area DA2 may have a higher light transmittance than the first display area DA1.

The driving circuit unit 300 may be electrically connected to the display module 200. The driving circuit unit 300 may include a main circuit board MB and a flexible film CF.

The flexible film CF is electrically connected to the display module 200. The flexible film CF may be connected to the pads PD of the display module 200 located in the peripheral area NAA. The flexible film CF provides an electrical signal for driving the display module 200 to the display module 200. The electrical signal may be generated from the flexible film CF or generated from the main circuit board MB. The main circuit board MB may include various driving circuits for driving the display module 200 or connectors for supplying power.

The lower electronic modules 500 may include a first lower electronic module 501 and a second lower electronic module 502. On a plane, or in a plan view, the first and second lower electronic modules 501 and 502 may overlap the second display area DA2. The first and second lower electronic modules 501 and 502 may be located under the display module 200. The first and second lower electronic modules 501 and 502 may receive an external input transferred through the second display area DA2 or may output a signal through the second display area DA2. For example, because the second display area DA2 has a higher light transmittance than the first display area DA1, the lower electronic modules 500 easily transfer and/or receive signals through the second display area DA2.

The housing 400 is coupled to the window 100. The housing 400 is coupled to the window 100 to provide an internal space. The display module 200 and the lower electronic modules 500 may be accommodated in the internal space.

The housing 400 may include a material having a relatively high rigidity. For example, the housing 400 may include a plurality of frames and/or plates made of glass, plastic, metal, or a combination thereof. The housing 400 may stably protect the components of the display device DD accommodated in the internal space from external impact.

Referring to FIG. 2, the display device DD may include the display module 200, a power supply module PM, a first electronic module EM1, and a second electronic module EM2. The display module 200, the power supply module PM, the first electronic module EM1, and the second electronic module EM2 may be electrically connected to one another.

The display module 200 may include a display panel 210 and an input sensing unit 220.

As illustrated in FIGS. 1A, 1B, and 2, the display panel 210 may be configured to actually generate the image IM. The image IM generated by the display panel 210 is displayed on the front surface IS and visually recognized by the user from the outside through the transmission area TA.

The input sensing unit 220 senses the user's input TC applied from the outside. For example, the input sensing unit 220 may sense the user's input TC provided to the window 100. The user's input TC includes various types of inputs such as a part of the user's body, light, heat, pen, or pressure. According to some embodiments, the user's input TC is illustrated as a user's hand applied to the display surface FS. However, this is illustrated by way of example, and as described above, the user's input TC may be provided in various types, and also depending on a structure of the display device DD, the user's input TC applied to a side or a rear surface of the display device DD may be sensed, and embodiments according to the present disclosure are not limited to any one embodiment.

The power supply module PM supplies power required for the overall operation of the display device DD. The power supply module PM may include a typical battery module.

The first electronic module EM1 and the second electronic module EM2 may include various functional modules for operating the display device DD.

The first electronic module EM1 may be directly mounted on a motherboard electrically connected to the display module 200 or may be mounted on a separate board to be electrically connected to the motherboard through a connector, etc.

The first electronic module EM1 may include a control module CM, a wireless communication module TM, an image input module IIM, an audio input module AIM, a memory MM, a compensation module CB, and an external interface IF. Some of the modules may not be mounted on the motherboard, but may be electrically connected to the motherboard through a flexible circuit board.

The control module CM controls the overall operation of the display device DD. The control module CM may be a microprocessor. The microprocessor may be an application processor unit (APU), a graphic processing unit (GPU), or a central processing unit (CPU). For example, the control module CM activates or deactivates the display module 200. The control module CM may control other modules such as the image input module IIM or the audio input module AIM, based on a touch signal received from the display module 200.

The wireless communication module TM may transmit/receive a wireless signal with another terminal using a Bluetooth or Wi-Fi line. The wireless communication module TM may transmit/receive a voice signal using a general communication line. The wireless communication module TM may include a transmitter TM1 that modulates and transmits a signal to be transmitted, and a receiver TM2 that demodulates a received signal.

The image input module IIM processes the image signal and converts the processed image signal into image data that can be displayed on the display module 200. The audio input module AIM receives an external sound signal by a microphone in a recording mode, a voice recognition mode, etc., and converts the received external sound signal into electrical voice data.

The external interface IF may serve as an interface connected to an external charger, a wired/wireless data port, a card (e.g., a memory card, a SIM/UIM card) socket, etc.

The second electronic module EM2 may include an audio output module AOM, a light emitting module LM, a light receiving module LRM, a camera module CMM, etc. The components may be directly mounted on the motherboard, or may be mounted on a separate board to be electrically connected to the display module 200 through a connector, or may be electrically connected to the first electronic module EM1.

The audio output module AOM converts audio data received from the wireless communication module TM or audio data stored in the memory MM and outputs the converted audio data to the outside.

The light emitting module LM generates and outputs light. The light emitting module LM may output infrared rays. The light emitting module LM may include an LED element. The light receiving module LRM may sense infrared rays. The light receiving module LRM may be activated when the infrared rays of a level (e.g., a set or predetermined level) or more are sensed. The light receiving module LRM may include a CMOS sensor. After infrared light generated by the light emitting module LM is output, it is reflected by an external object (e.g., a user's finger or face), and the reflected infrared light may be incident on the light receiving module LRM. The camera module CMM may capture an external image.

The camera module CMM may include at least one of a wide-angle camera, a front camera, a telephoto camera, or a rear camera. The camera module CMM may include a lens assembly, a flash, an image sensor, and an image processor. The lens assembly may collect light emitted from an object, which is a subject for capturing an image. The lens assembly may include one or more lenses. The image sensor may acquire an image corresponding to the object by converting light transferred from the object through the lens assembly into an electrical signal. The image processor controls the image sensor, and processes the image acquired by the image sensor. The image processor may be embedded in the control module CM or may be provided as a separate component.

The compensation module CB may receive a raw image signal corresponding to an image (hereinafter, a raw image) acquired by the camera module CMM, and may compensate the raw image signal by using a compensation program utilizing a learning data based-deep learning algorithm to generate a compensation image signal. The compensation image signal may be provided to the control module CM and then may be converted into a signal suitable for display on the display panel 210. Accordingly, an image corresponding to the compensation image signal may be displayed on the display panel 210. The compensation module CB will be described in more detail later with reference to FIG. 5.

The compensation module CB may be embedded in the control module CM. However, embodiments according to the present disclosure are not limited thereto. The compensation module CB may be embedded in an image processor or a neural network processing unit (NPU).

Each of the first and second lower electronic modules 501 and 502 according to some embodiments of the present disclosure may include at least one of the configurations of the first electronic module EM1 or the second electronic module EM2. For example, each of the first and second lower electronic modules 501 and 502 may include at least one of the audio output module AOM, the light emitting module LM, the light receiving module LRM, or the camera module CMM. The first and second lower electronic modules 501 and 502 may sense an external object received through the second display area DA2 (as illustrated in FIG. 1B), or may provide a sound signal such as a voice signal or light such as the infrared light to the outside through the second display area DA2. As an example of the present disclosure, the first and second lower electronic modules 501 and 502 may include at least the camera module CMM.

Figure 3A:
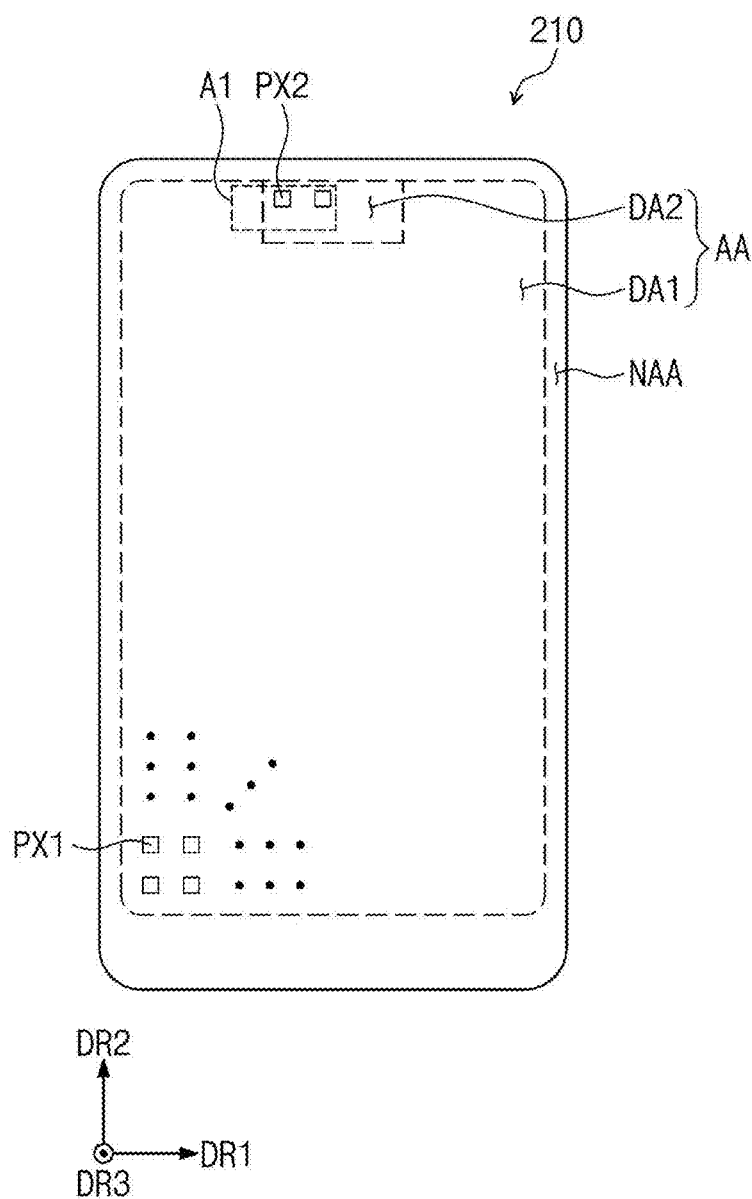
Figure 3B:
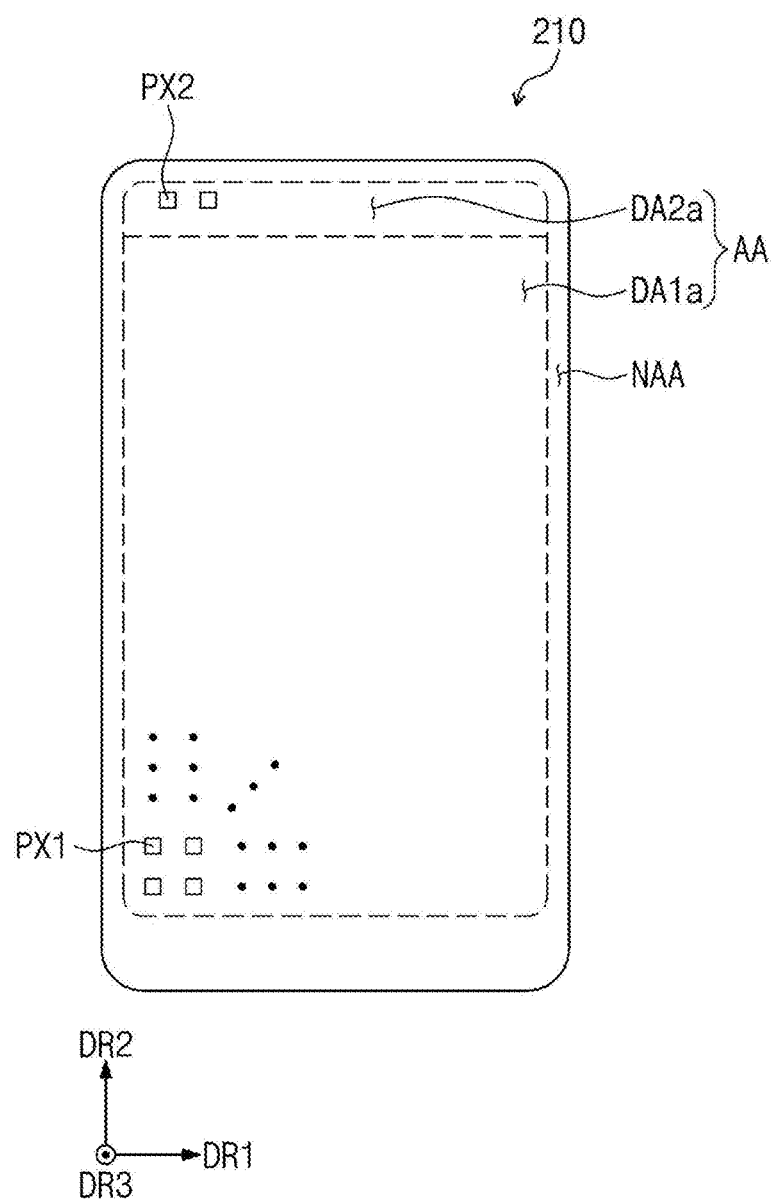

FIGS. 3A to 3C are plan views of a display panel according to example embodiments of the present disclosure.

Referring to FIGS. 1B and 3A, the first display area DA1 and the second display area DA2 may be defined in the display panel 210. The first display area DA1 and the second display area DA2 may correspond to the active area AA of the display module 200.

The lower electronic modules 500 may be located under the second display area DA2. The light transmittance of the second display area DA2 may be higher than that of the first display area DA1. Accordingly, a signal may be relatively easily transferred and/or received to/from the lower electronic modules 500 through the second display area DA2. To increase light transmittance, some elements of the second display area DA2 may be omitted. For example, some of the pixels located in the second display area DA2 may be removed.

The first display area DA1 and the second display area DA2 may be adjacent to each other. The second display area DA2 may have a rectangular shape, and at least one side defining the second display area DA2 may be adjacent to the first display area DA1. FIG. 3A illustrates that three sides are adjacent to the first display area DA1 and the other one side is adjacent to the peripheral area NAA as an example of the present disclosure, but embodiments according to the present disclosure are not limited thereto. Also, as an example of the present disclosure, when viewed in a plane or in a plan view, the second display area DA2 may be defined on an upper portion of the display panel 210.

First pixels PX1 may be located in the first display area DA1, and second pixels PX2 may be located in the second display area DA2. The first pixels PX1 and the second pixels PX2 may be pixels that generate light. The number of first pixels PX1 and the number of second pixels PX2 within the same area (hereinafter, a unit area) may be different from each other. For example, the number of second pixels PX2 may be less than the number of first pixels PX1 within the unit area. Accordingly, the light transmittance of the second display area DA2 may be higher than the light transmittance of the first display area DA1. Also, a resolution of the second display area DA2 may be lower than that of the first display area DA1.

The first and second pixels PX1 and PX2 may have actually the same configuration. The configuration of the first and second pixels PX1 and PX2 will be described later with reference to drawings.

Referring to FIG. 3B, a first display area DA1a and a second display area DA2a may be defined in the display panel 210. The lower electronic modules 500 may be located under the second display area DA2a.

The second display area DA2a may have a rectangular shape. In FIG. 3B, one side defining the second display area DA2a may be adjacent to the first display area DA1a, and the remaining three sides may be adjacent to the peripheral area NAA. Also, as an example of the present disclosure, when viewed in a plane, the second display area DA2a may be defined at an upper portion of the display panel 210. However, embodiments according to the present disclosure are not limited thereto. For example, the second display area DA2a may be defined at a lower portion of the display panel 210.

Referring to FIG. 3C, a second display area DA2b may be surrounded by a first display area DA1b. As an example of the present disclosure, the second display area DA2b may have a circular shape. FIG. 3C illustrates a structure in which a portion of the first display area DA1b is located between the second display area DA2b and the peripheral area NAA so that the second display area DA2b and the peripheral area NAA are separated. However, embodiments according to the present disclosure are not limited thereto. For example, one end of the second display area DA2b may directly contact the peripheral area NAA.

In FIGS. 3A to 3C, it is illustrated as an example that the number of the second display areas DA2, DA2a, and DA2b is one, but embodiments according to the present disclosure are not limited thereto. That is, as an example of the present disclosure, a plurality of second display areas may be provided in the display panel 210.

Figure 3D:
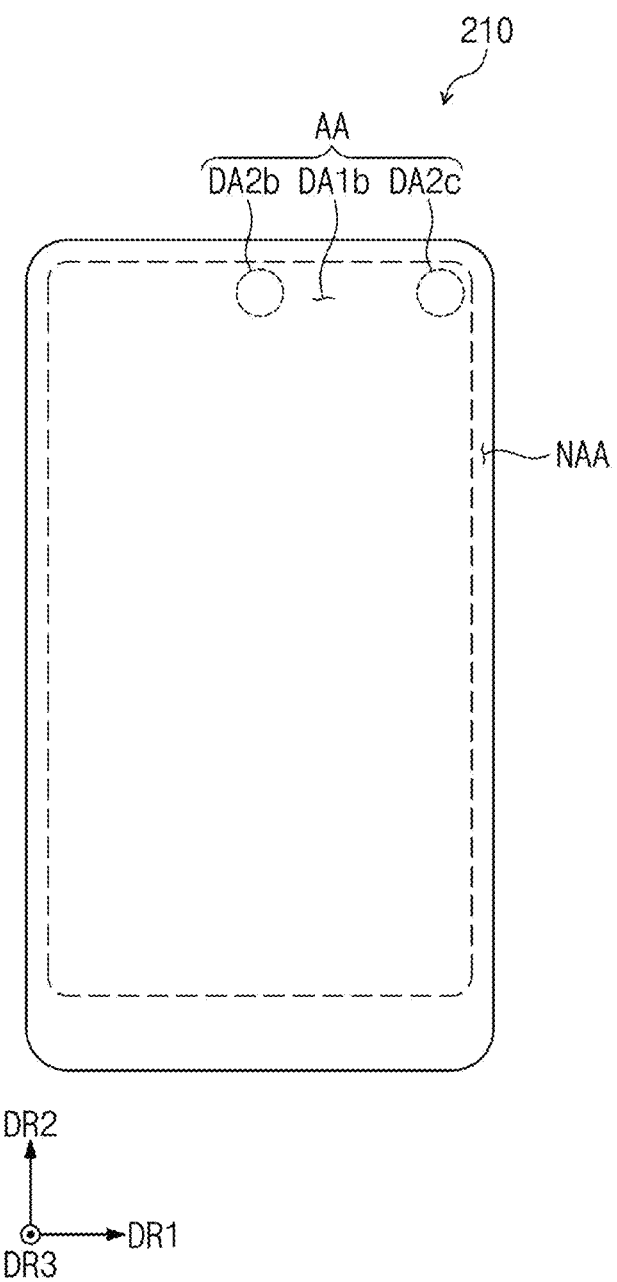

FIG. 3D illustrates a structure in which one first display area DA1b and two second display areas DA2b and DA2c are provided. The two second display areas DA2b and DA2c may have the same light transmittance. However, embodiments according to the present disclosure are not limited thereto. That is, the two second display areas DA2b and DA2c may have different light transmittances. Also, the two second display areas DA2b and DA2c may have the same shape and size. However, embodiments according to the present disclosure are not limited thereto. For example, the two second display areas DA2b and DA2c may have different shapes or different sizes.

Figure 4A:
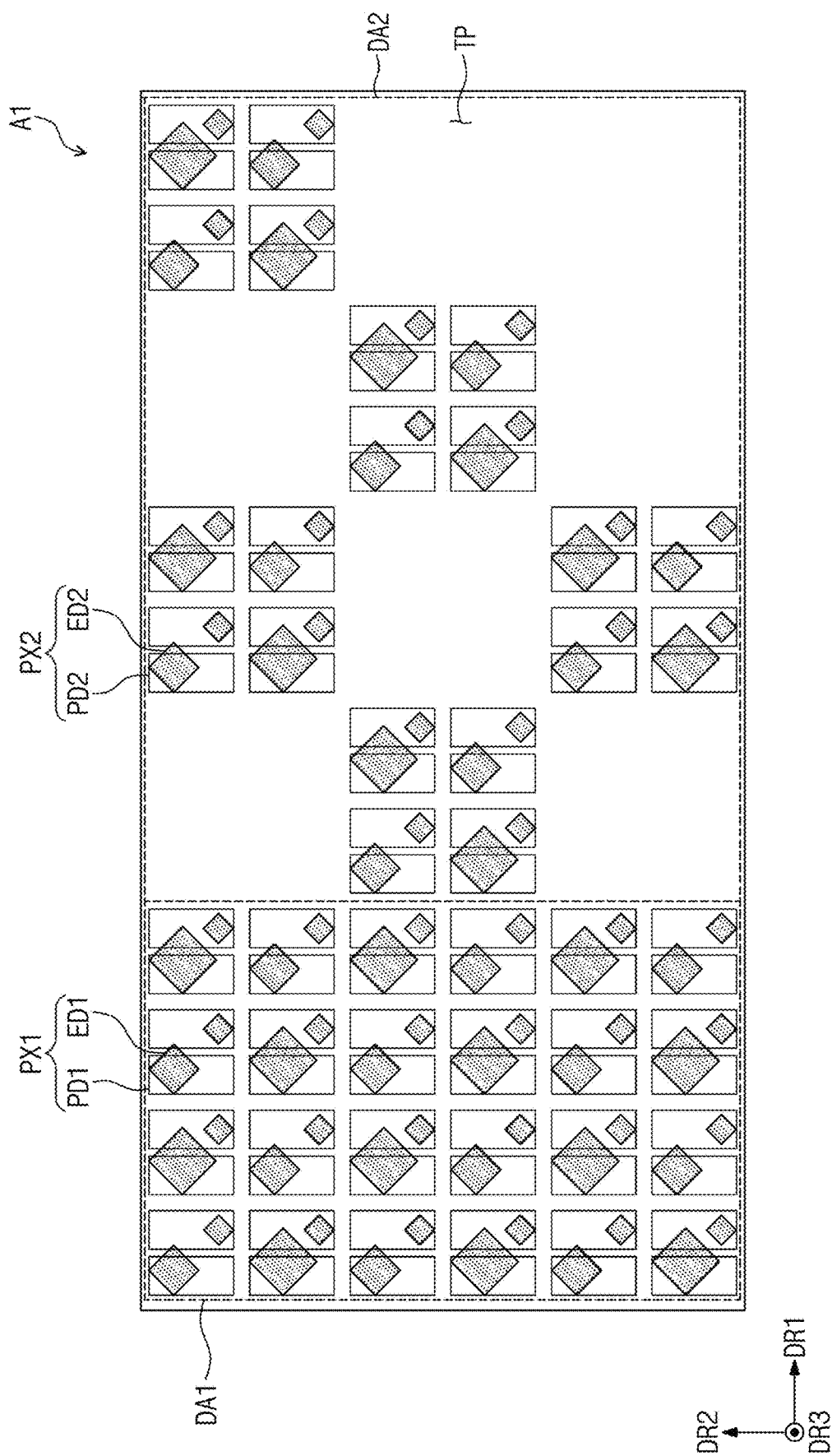
FIGS. 4A and 4B are enlarged plan views according to some embodiments of a portion A1 illustrated in FIG. 3A.
Figure 4B:
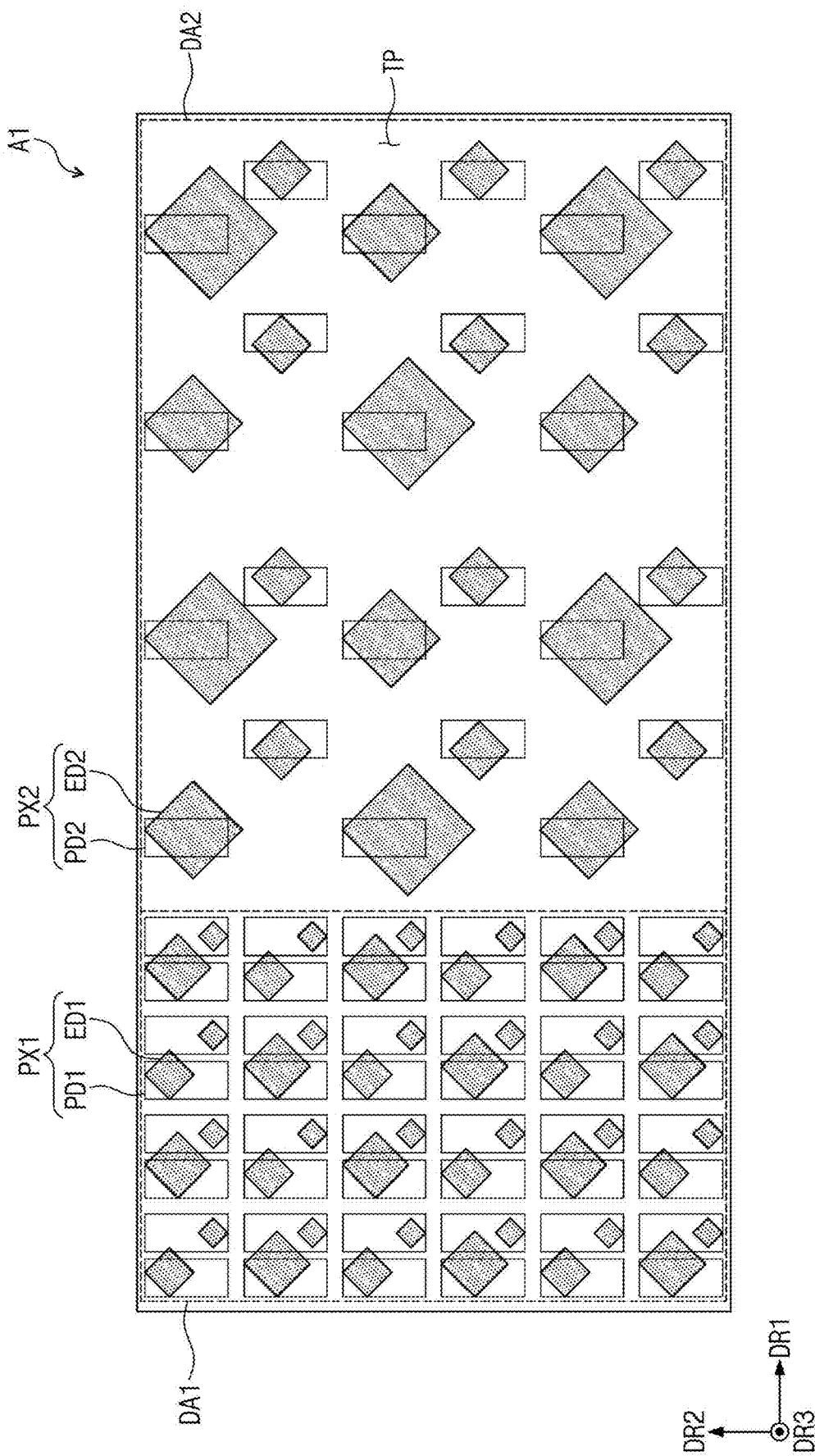

FIGS. 4A and 4B are enlarged plan views according to some embodiments of a portion A1 illustrated in FIG. 3A.

Referring to FIGS. 3A and 4A, the first pixels PX1 are located in the first display area DA1 of the display panel 210. The first pixels PX1 may include a plurality of first red pixels, a plurality of first green pixels, and a plurality of first blue pixels. Each of the first pixels PX1 includes a first pixel driving circuit PD1 and a first light emitting device ED1. The first pixel driving circuit PD1 is electrically connected to the corresponding first light emitting device ED1 to control driving of the first light emitting device ED1. The first pixel driving circuit PD1 may be arranged to overlap the electrically connected first light emitting device ED1 in the first display area DA1.

The first pixel driving circuit PD1 may include at least one transistor and at least one capacitor. The first light emitting device ED1 may include an organic light emitting device, an inorganic light emitting device, a quantum dot, a quantum rod, a micro LED, or a nano LED.

The second pixels PX2 are located in the second display area DA2 of the display panel 210. The second pixels PX2 may include a plurality of second red pixels, a plurality of second green pixels, and a plurality of second blue pixels. Each of the second pixels PX2 includes a second pixel driving circuit PD2 and a second light emitting device ED2. The second pixel driving circuit PD2 is electrically connected to the corresponding second light emitting device ED2 to control driving of the second light emitting device ED2. The second pixel driving circuit PD2 may be arranged to overlap the electrically connected second light emitting device ED2 in the second display area DA2.

The second pixel driving circuit PD2 may include at least one transistor and at least one capacitor. The second light emitting device ED2 may include an organic light emitting device, an inorganic light emitting device, a quantum dot, a quantum rod, a micro LED, or a nano LED. The first pixel driving circuit PD1 and the second pixel driving circuit PD2 may have the same or different circuit configurations. In addition, the first and second light emitting devices ED1 and ED2 may be composed of the same light emitting device or different light emitting devices.

As illustrated in FIG. 4A, when the first light emitting device ED1 and the second light emitting device ED2 outputting the same color are compared, they may have the same size and the same shape. However, the number of second pixels PX2 arranged per unit area in the second display area DA2 is less than or equal to the number of first pixels PX1 arranged per unit area in the first display area DA1. As an example of the present disclosure, a unit area may be defined as a size that covers eight or more first pixels PX1. In FIG. 4A, as an example of the present disclosure, it is illustrated that the number of second pixels PX2 arranged per unit area in the second display area DA2 is reduced by ½ compared to the number of first pixels PX1 arranged per unit area in the first display area DA1. However, embodiments according to the present disclosure are not limited thereto. For example, the number of second pixels PX2 arranged per unit area in the second display area DA2 is reduced by ¼ or ⅛ compared to the number of first pixels PX1 arranged per unit area in the first display area DA1. In this case, the unit area refers to a size that covers at least 16 first pixels PX1.

Referring to FIG. 4B, the number of second pixels PX2 arranged per unit area in the second display area DA2 is reduced by ¼ compared to the number of first pixels PX1 arranged per unit area in the first display area DA1. In this case, the unit area may have a size that covers 16 first pixels PX1, and the number of second pixels PX2 arranged per unit area in the second display area DA2 may be four.

In FIG. 4B, when the first light emitting device ED1 and the second light emitting device ED2 outputting the same color are compared, they may have different sizes or different shapes. The second light emitting device ED2 may have a size four times larger than that of the first light emitting device ED1. However, embodiments according to the present disclosure are not limited thereto. For example, the second light emitting device ED2 may have a size that is two or three times larger than that of the first light emitting device ED1.

Referring to FIGS. 4A and 4B, a transmission portion TP in which the second pixels PX2 are not located may be defined in the second display area DA2. The light transmittance of the second display area DA2 may vary depending on the area of the transmission portion TP. As the area of the transmission portion TP increases within a unit area, the light transmittance of the second display area DA2 may increase. When the light transmittance is increased, characteristics of the lower electronic modules 500 (refer to FIG. 1B) located under the second display area DA2 may be improved. For example, when the camera module CMM (refer to FIG. 2) is utilized as the lower electronic modules 500, a light blur phenomenon in an image generated by the camera module CMM may be improved. However, when the area of the transmission portion TP increases, the resolution in the second display area DA2 may be decreased. In this case, a boundary between the first and second display areas DA1 and DA2 is visible due to the difference in resolution between the first display area DA1 and the second display area DA2, so that the display quality of the display device DD may be decreased.

Figure 5:
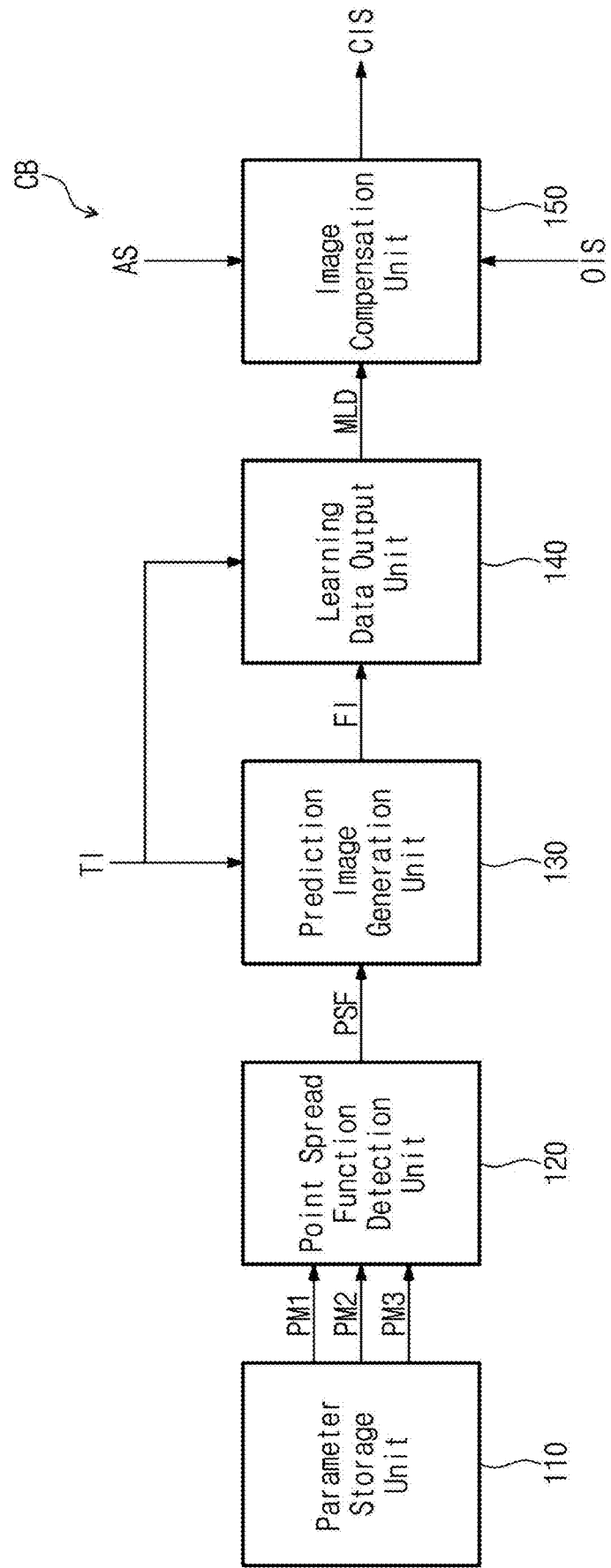
FIG. 5 is a block diagram according to some embodiments of a compensation module illustrated in FIG. 2.

FIG. 5 is a block diagram according to some embodiments of the compensation module illustrated in FIG. 2.

Referring to FIG. 5, the compensation module CB includes a parameter storage unit 110, a point spread function detection unit 120, a prediction image generation unit 130, a learning data output unit 140, and an image compensation unit 150.

The parameter storage unit 110 stores parameters according to hardware specifications. The parameters may include a first parameter PM1 including characteristics of the camera module CMM (as illustrated in FIG. 2), a second parameter PM2 including information (e.g., an area of the transmission portion TP (refer to FIGS. 4A and 4B) on the second display area DA2, and a third parameter PM3 including information (e.g., a pixel size and an inter-pixel spacing of the image sensor, etc.) corresponding to the image sensor.

Although FIG. 5 illustrates a structure in which the parameter storage unit 110 is embedded in the compensation module CB, embodiments according to the present disclosure are not limited thereto. For example, the parameter storage unit 110 may be embedded in the memory MM illustrated in FIG. 2.

The point spread function detection unit 120 receives the first to third parameters PM1, PM2, and PM3 from the parameter storage unit 110, and generates a point spread function PSF based on the first to third parameters PM1, PM2, and PM3.

The prediction image generation unit 130 receives the point spread function PSF from the point spread function detection unit 120. The prediction image generation unit 130 may predict and generate a flare image FI of the target image TI by using the point spread function PSF. The learning data output unit 140 generates learning data MLD by using the target image TI and the predicted flare image FI.

The image compensation unit 150 receives the raw image signal OIS from the control module CM or the camera module CMM, and compensates the raw image signal OIS using the learning data MLD to generate a compensation image signal CIS. The raw image signal OIS may be an image in which light blur occurs.

The image compensation unit 150 may be activated in response to a compensation control signal AS. When the compensation control signal AS is activated, the image compensation unit 150 is activated to perform a compensation operation, and when the compensation control signal AS is deactivated, the image compensation unit 150 is deactivated. As an example of the present disclosure, the display device DD may operate in a non-normal compensation mode in which the compensation module CB is selectively activated in response to the compensation control signal AS or in a normal compensation mode in which the compensation module CB is always activated. In the normal compensation mode, the compensation module CB may maintain a normal activation state in a turn-on state of the display device DD (refer to FIG. 2).

Hereinafter, a case in which the display device DD operates in a non-normal compensation mode will be described in more detail with reference to FIGS. 6A to 6D.

FIGS. 6A to 6D are screens illustrating a process in which a compensation module is activated in a normally off compensation mode according to some embodiments of the present disclosure.

Figure 6A:
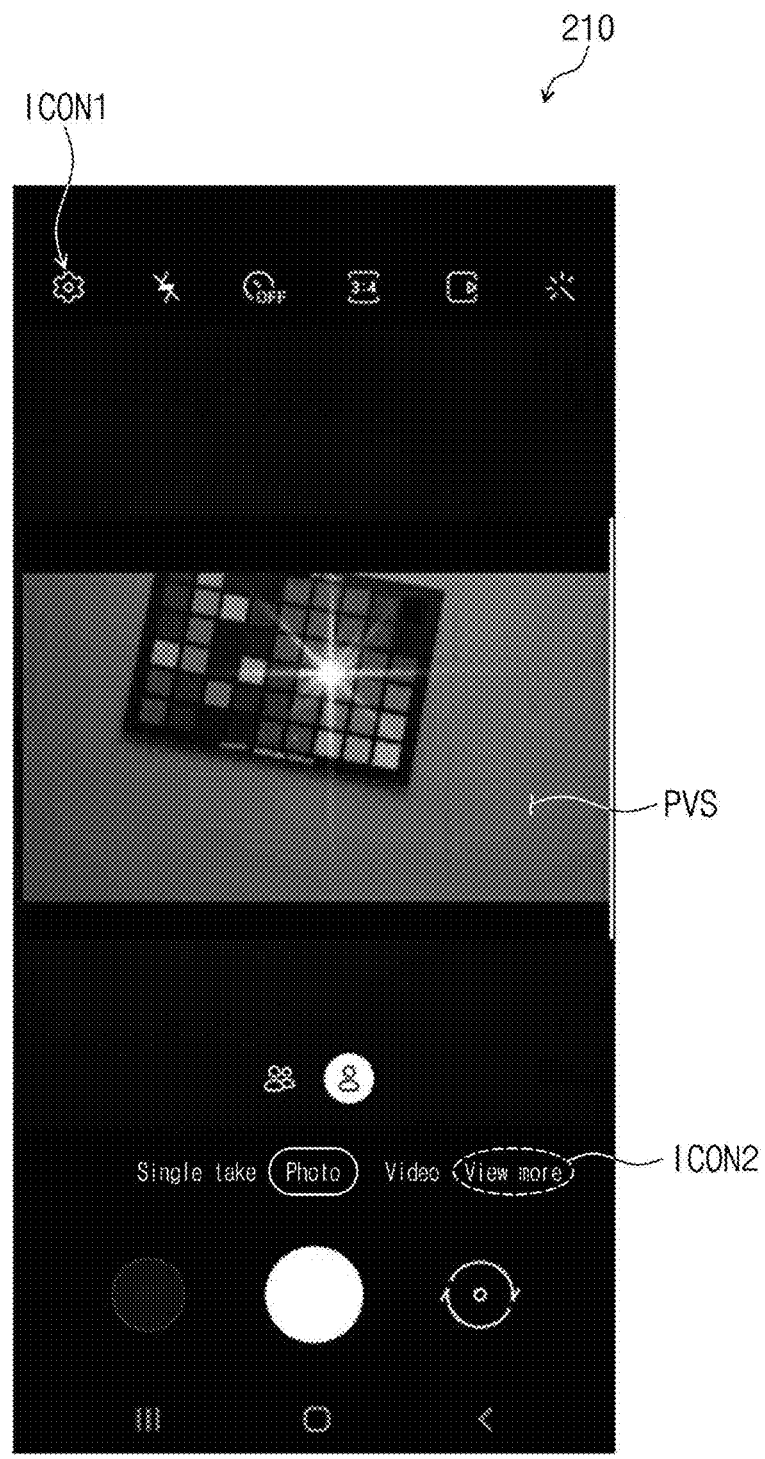
FIGS. 6A to 6D are screens illustrating a process in which a compensation module is activated in a normally off compensation mode according to some embodiments of the present disclosure.

Referring to FIGS. 2, 5, and 6A, in the display device DD operating in the non-normal compensation mode, the compensation module CB may be activated in response to the compensation control signal AS. As an example of the present disclosure, the compensation control signal AS may be activated or deactivated by a setting signal input by a user. However, embodiments according to the present disclosure are not limited thereto. That is, the compensation control signal AS may be automatically activated when a specific application is executed. For example, when the display device DD executes a camera shooting application or a video conference application, the control module CM may transmit the activated compensation control signal AS to the compensation module CB.

FIGS. 6A to 6D illustrate an example of a manual mode in which the compensation module CB is not automatically activated even when the camera shooting application is executed. When the camera shooting application is executed, the display panel 210 may display a preview screen PVS for showing an image being photographed by the camera module CMM on the screen.

Figure 6B:
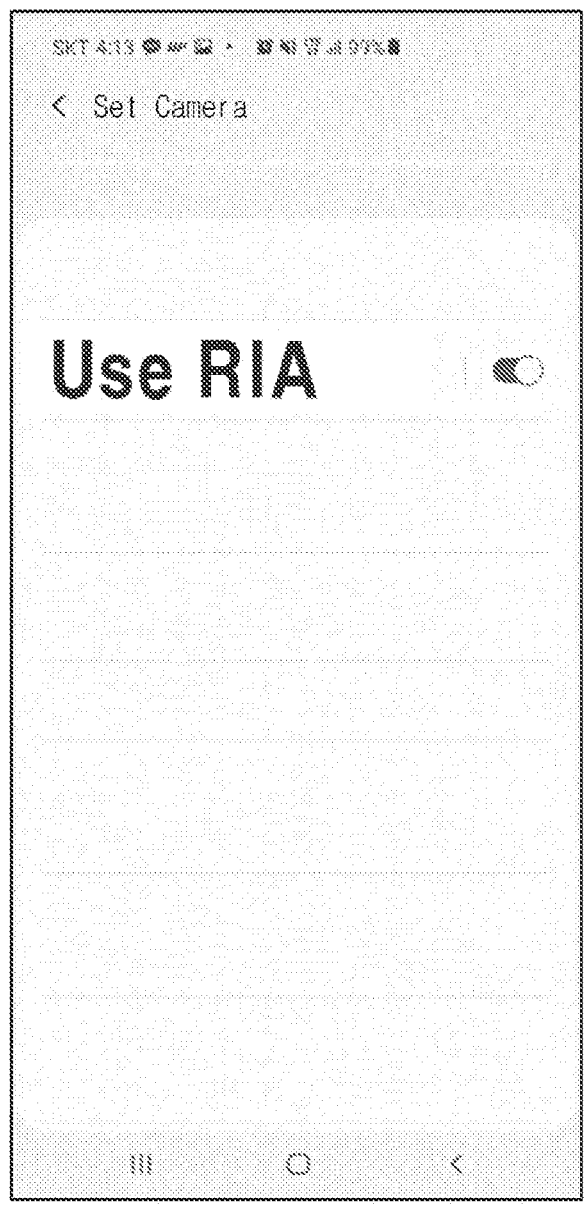

The user may select an environment setting icon ICON1 on the preview screen PVS. When the environment setting icon ICON1 is selected, a screen capable of selecting various environment settings related to a camera shooting operation may be provided as illustrated in FIG. 6B. Among various environment settings, when a setting item "Use RIA" is activated to "ON" state, the compensation mode may be activated. For example, when the setting signal "Use RIA" is changed to the "ON" state, the control module CM may provide the activated compensation control signal AS to the compensation module CB.

When the setting signal is activated by the user, the display device DD may enter the compensation mode in which the compensation module CB is activated. For example, in the manual mode, the display device DD may provide a user interface to allow the user to turn the setting signal "ON" or "OFF". FIG. 6B illustrates a user interface only, and embodiments according to the present disclosure are not limited thereto.

Figure 6C:
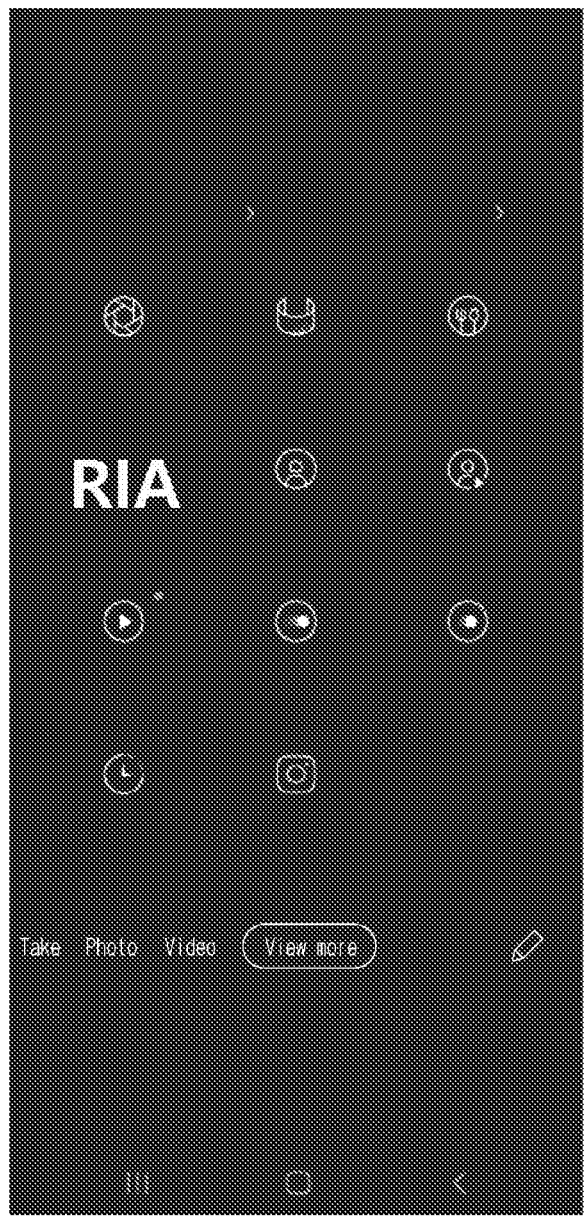

Referring to FIGS. 6A and 6C, the user may select a "View More" icon ICON2 in the camera shooting application. When the "View More" icon ICON2 is selected, a screen capable of selecting additional functions related to camera shooting may be provided as illustrated in FIG. 6C. Among them, the user may click an icon "RIA". When the "RIA" icon is clicked, the screen of the display device DD is switched to the preview screen PVS.

Figure 6D:
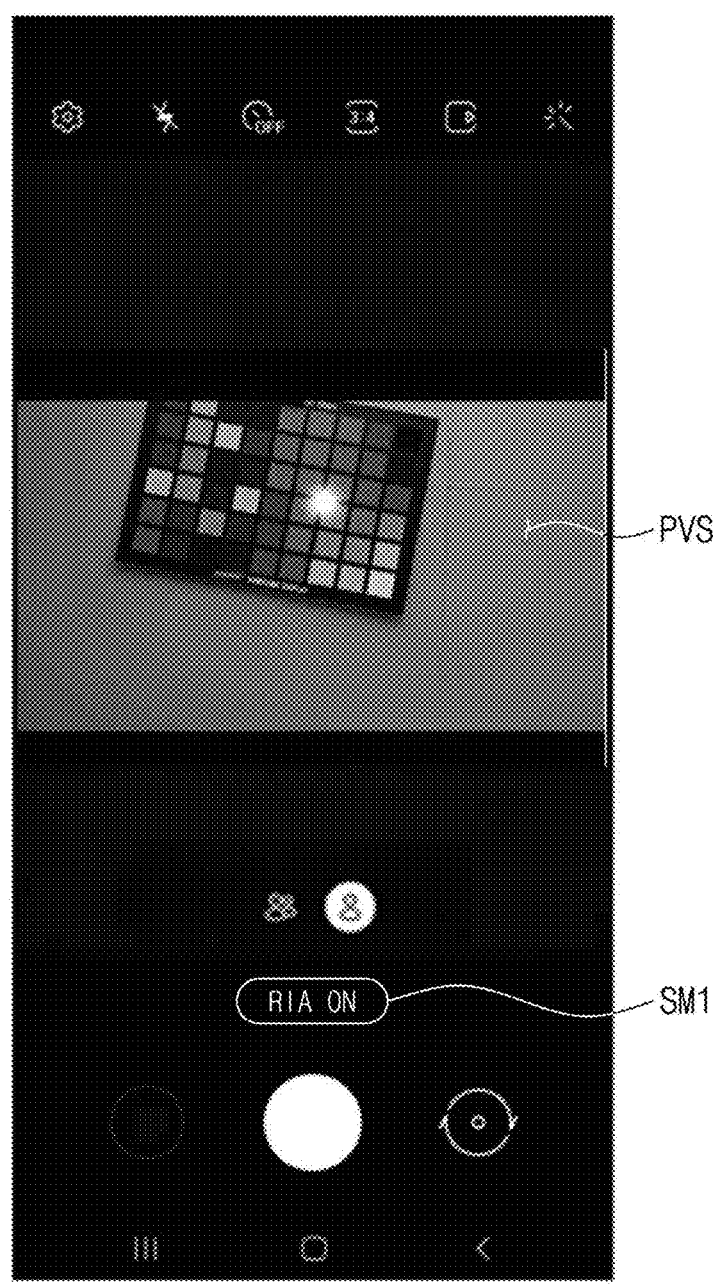

Referring to FIG. 6D, a status message SM1 stating "RIA ON" may be displayed on the preview screen PVS. For example, when an "RIA" icon is clicked, the display device DD may enter the compensation mode in which the compensation module CB is activated. The status message SM1 stating "RIA ON" may be displayed on the preview screen PVS to inform the user that the compensation mode is currently activated.

In addition to the methods illustrated in FIGS. 6B and 6C, the display device DD may provide various types of user interfaces such that the user can select to enter the compensation mode. When the display device DD enters the compensation mode by the user's selection in the manner illustrated in FIGS. 6B and 6C, the image being photographed by the camera module CMM may be compensated and displayed on the preview screen PVS. In this case, an image displayed on the preview screen PVS before compensation may be referred to as a raw image, and an image displayed on the preview screen PVS after compensation may be referred to as a compensation image.

Before entering the compensation mode as illustrated in FIG. 6A, the light blur phenomenon occurs in the raw image displayed on the preview screen PVS. However, the light blur phenomenon does not occur in the compensation image displayed on the preview screen PVS after entering the compensation mode as illustrated in FIG. 6D. That is, the compensation module CB is provided with the raw image signal OIS for the raw image (refer to FIG. 5), and the compensation module CB compensates the raw image signal OIS in real time to output the compensation image signal CIS. The display panel 210 may display a compensation image based on the compensation image signal CIS on the preview screen PVS.

Accordingly, as the compensation module CB is activated while the camera shooting application is running, the display device DD may provide a compensation image with improved quality to the user.

According to some embodiments of the present disclosure, the compensation module CB may be selectively activated depending on a front camera shooting mode or a rear camera shooting mode. For example, the compensation module CB may be activated in the front camera shooting mode and may be deactivated in the rear camera shooting mode. In the front camera shooting mode, light generated from the second pixel PX2 (refer to FIG. 3A) located in the second display area DA2 (refer to FIG. 3A) may be incident to the camera module CMM. That is, the light blur phenomenon may be more severe in the front camera shooting mode than in the rear camera shooting mode. Accordingly, according to some embodiments of the present disclosure, the compensation module CB may be activated in the front camera shooting mode to compensate the raw image. However, embodiments according to the present disclosure are not limited thereto. That is, the compensation module CB may maintain an active state while the camera shooting application is running regardless of the front camera shooting mode or the rear camera shooting mode.

Because the display device DD includes the compensation module CB, it is possible to prevent or reduce deterioration of the image quality before/after camera shooting due to the light blur phenomenon that occurs when the camera module CMM is located under the second display area DA2.

Figure 7A:
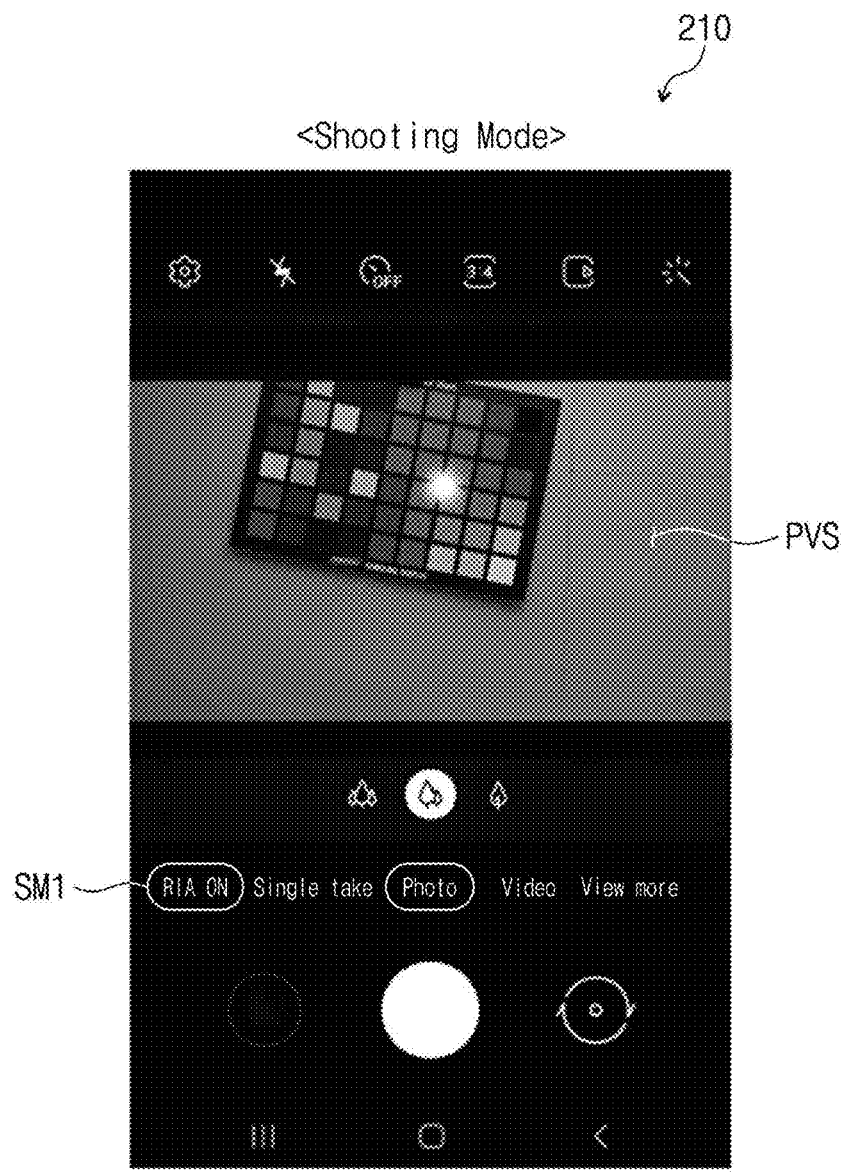
FIGS. 7A and 7B are screens illustrating a state in which a display device according to embodiments of the present disclosure operates in a normally on compensation mode.
Figure 7B:
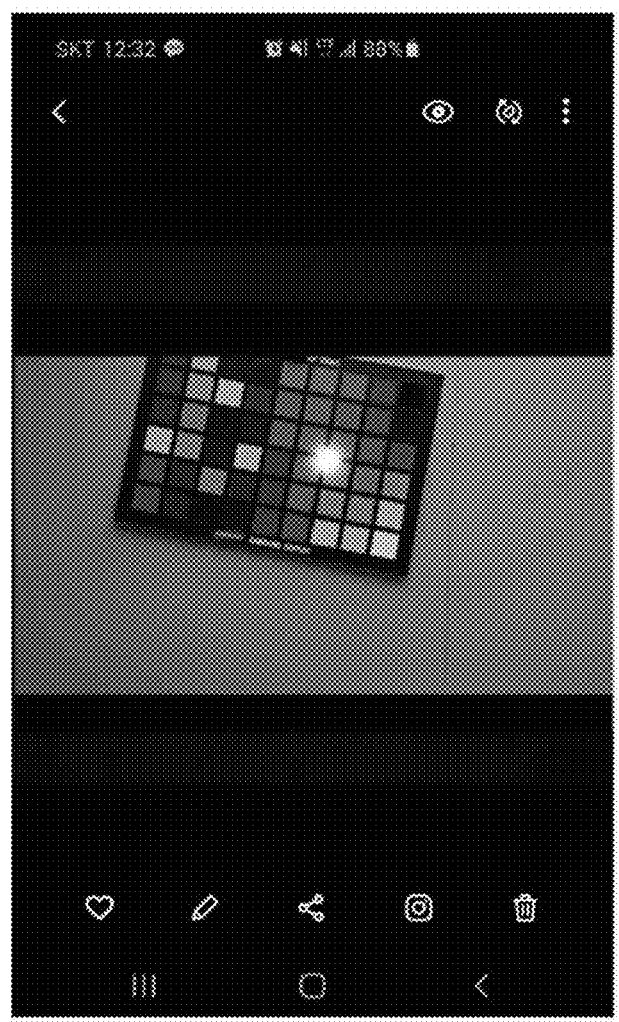

FIGS. 7A and 7B are screens illustrating a state in which a display device according to embodiments of the present disclosure operates in a normally on compensation mode.

Referring to FIGS. 5, 7A, and 7B, in the display device DD operating in the normal compensation mode, the compensation module CB may be in a normal activation state. In this case, to activate the compensation module CB, the user does not need to provide a separate input to the display device DD. In the normal compensation mode, when the user executes the camera shooting application, the compensation module CB is automatically activated. Accordingly, the first compensation image in which the light blur phenomenon does not occur may be always displayed on the preview screen PVS. The status message SM1 stating "RIA ON" may be further displayed on the preview screen PVS. Accordingly, the user may visually confirm that the compensation module CB is in the activation state through the status message SM1.

Thereafter, when the shooting operation is completed, the second compensation image may be stored in a gallery as illustrated in FIG. 7B. The light blur phenomenon does not appear even in the second compensation image stored in the gallery.

Figure 8A:
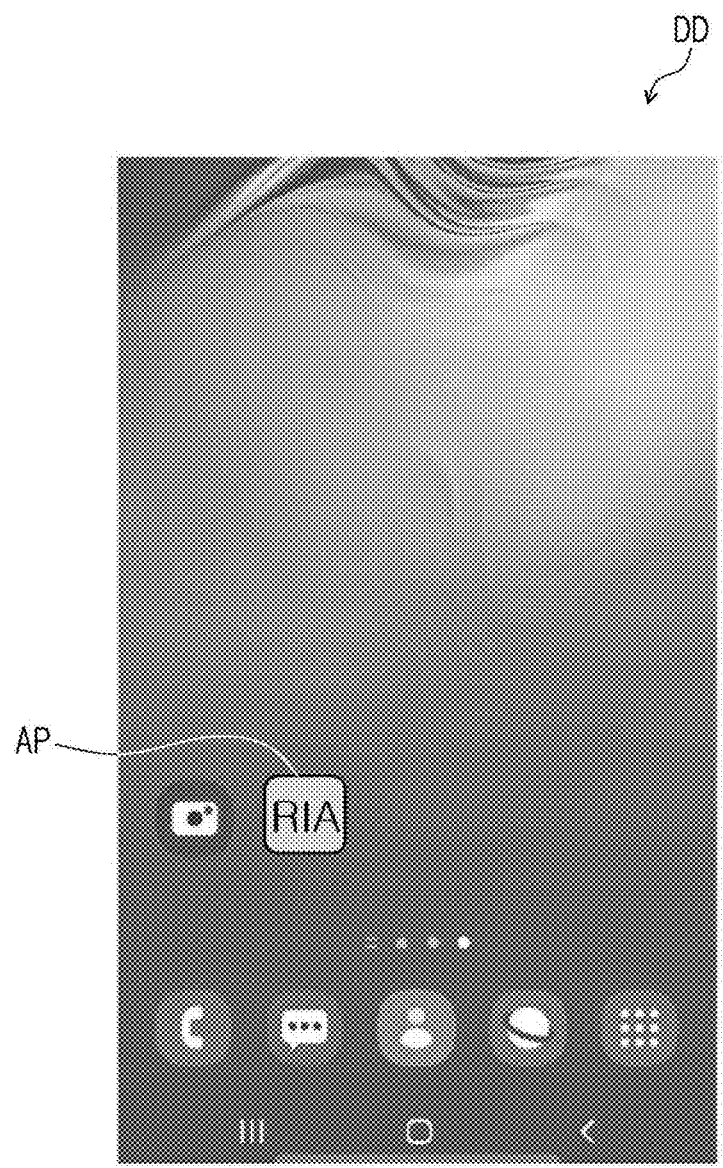
FIGS. 8A to 8C are diagrams illustrating a compensation application execution process according to some embodiments of the present disclosure.
Figure 8B:
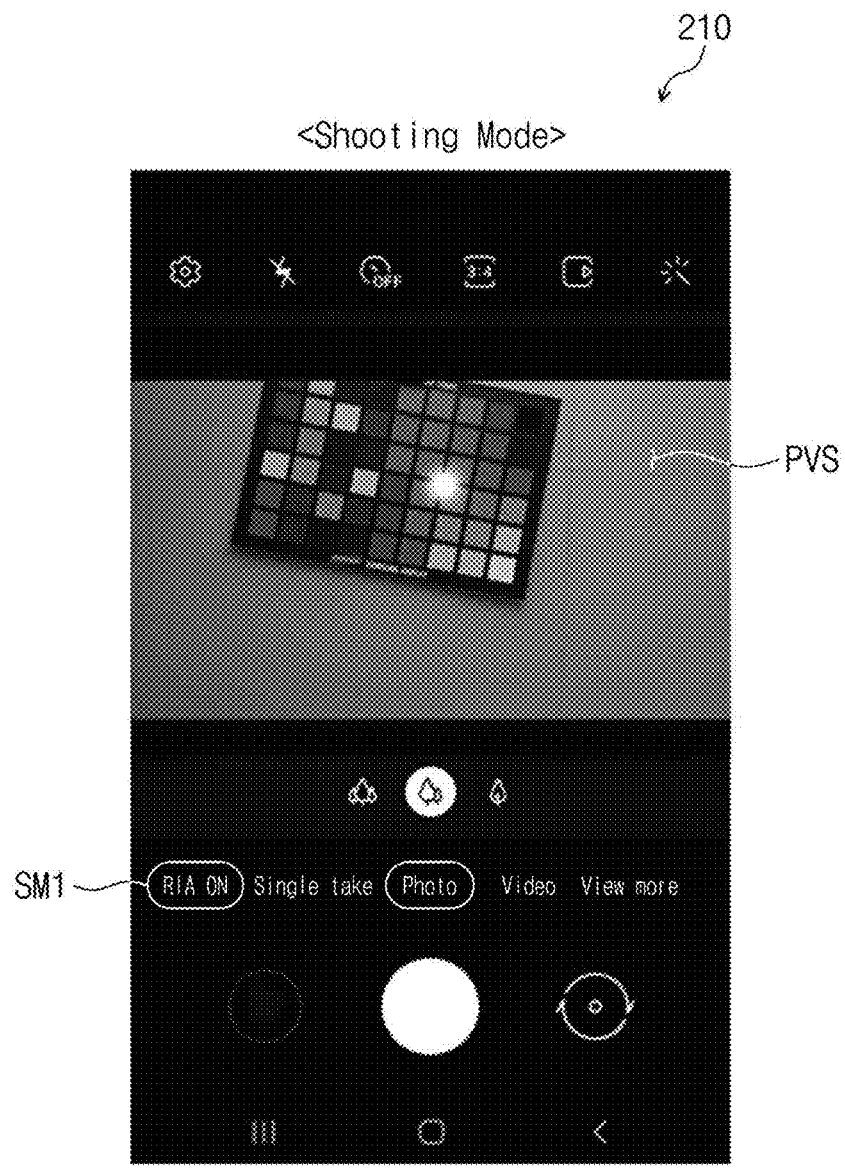
Figure 8C:
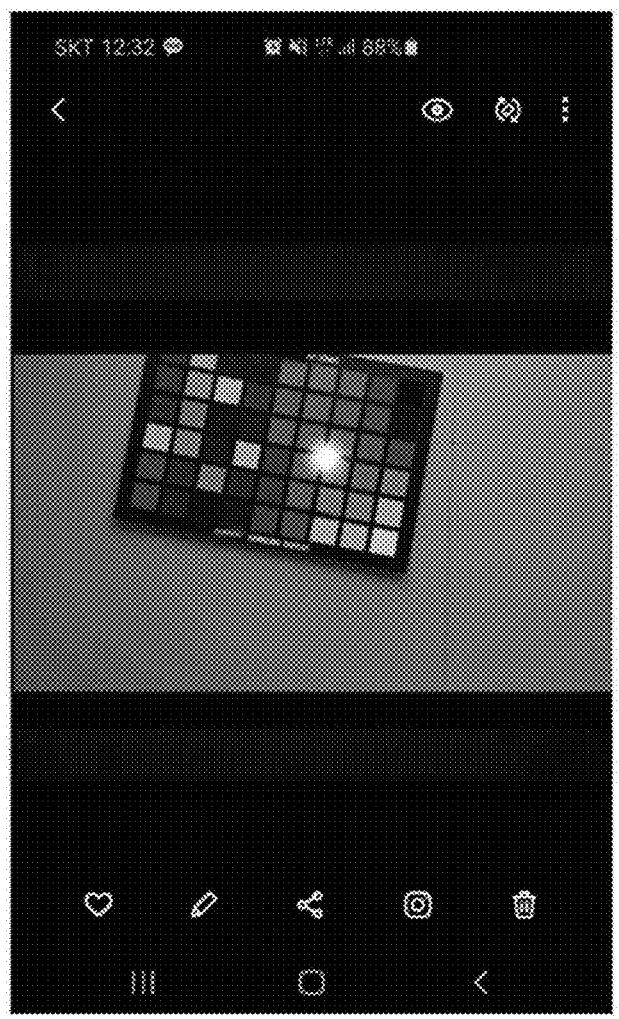

FIGS. 8A to 8C are diagrams illustrating a compensation application execution process according to some embodiments of the present disclosure.

Referring to FIGS. 8A to 8C, the compensation module CB (refer to FIG. 5) according to some embodiments of the present disclosure is not embedded in the display device DD. A compensation application AP in which a compensation program is stored may be installed in the display device DD. The compensation application AP may be provided as a basic option to the display device DD, or a user may download and install the compensation application AP in the display device DD.

The display device DD in which the compensation application AP is installed may operate in the non-normal compensation mode in which the compensation program is selectively activated in response to the compensation control signal or in the normal compensation mode in which the compensation program is always activated.

In the display device DD operating in the non-normal compensation mode, the compensation program may be activated in response to the compensation control signal. As an example of the present disclosure, the compensation control signal may be generated by a setting signal input by a user. A method for a user to input a setting signal is similar to that illustrated in FIGS. 6B and 6C, and thus additional descriptions thereof will be omitted. In the display device DD operating in the normal compensation mode, the compensation program may be always activated.

As illustrated in FIGS. 8B and 8C, in the state in which the compensation program is activated, when the camera shooting application is executed (i.e., entering the camera shooting mode), the display panel 210 may display the preview screen PVS for showing an image being photographed by the camera module CMM (refer to FIG. 2) on the screen. The status message SM1 of "RIA ON" may be displayed on the preview screen PVS. Accordingly, the user may visually confirm that the compensation application AP is executed through this status message SM1.

When a shooting mode is entered while the compensation application AP is running, the first compensation image obtained by compensating the raw image is displayed on the preview screen PVS. The light blur phenomenon does not occur in the first compensation image. That is, the compensation program of the compensation application AP compensates the raw image signal for the raw image and outputs the compensation image signal. Accordingly, the display panel 210 may display the first compensation image based on the compensation image signal on the preview screen PVS.

Thereafter, when the shooting operation is completed, the second compensation image may be stored in the gallery as illustrated in FIG. 8C. The light blur phenomenon does not appear even in the second compensation image stored in the gallery.

Figure 9A:
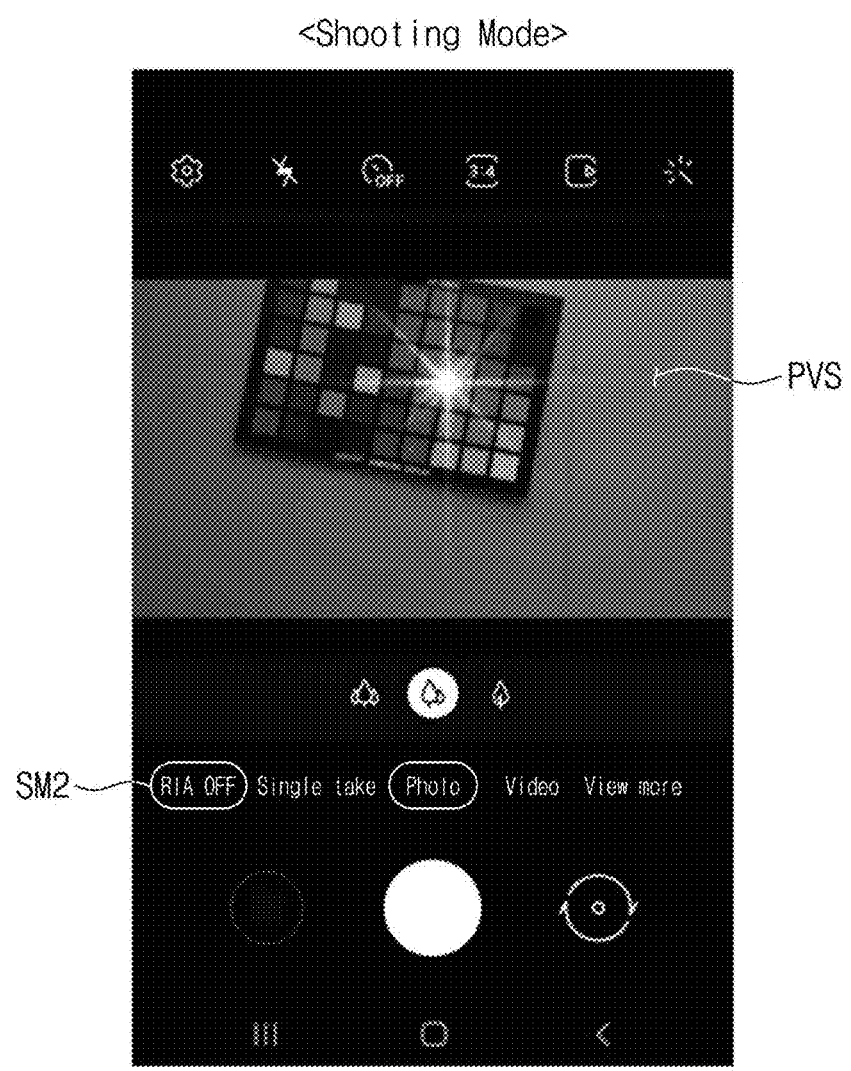
FIGS. 9A to 9C are diagrams illustrating a compensation application execution process according to some embodiments of the present disclosure.
Figure 9B:
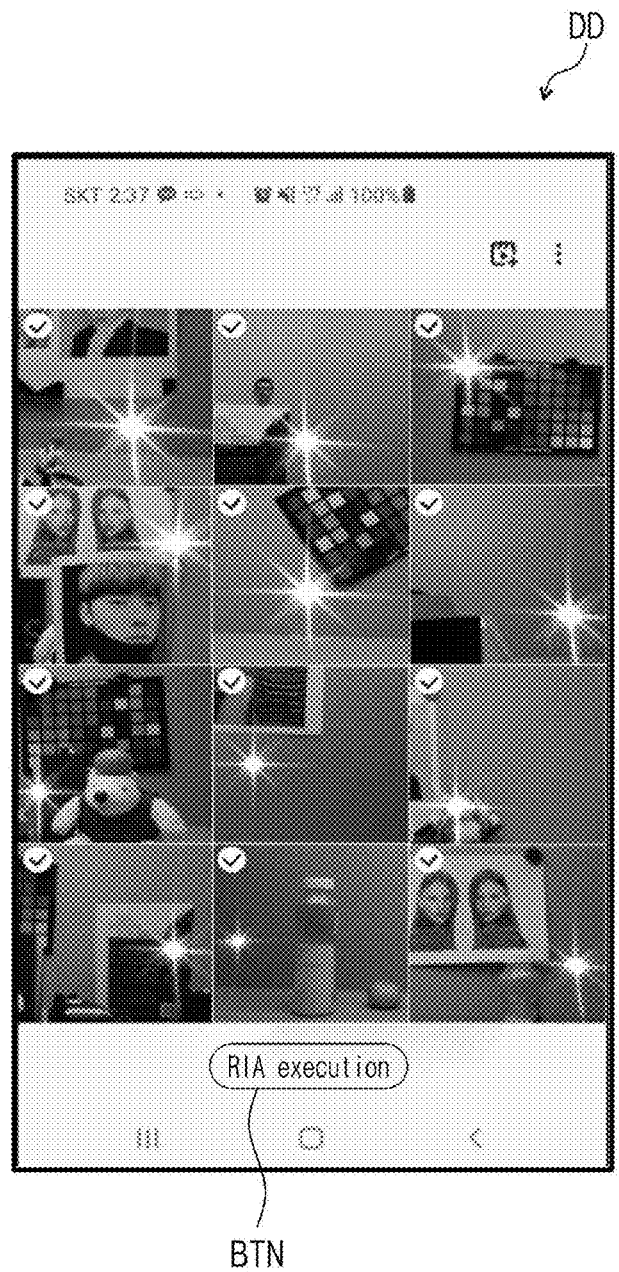
Figure 9C:
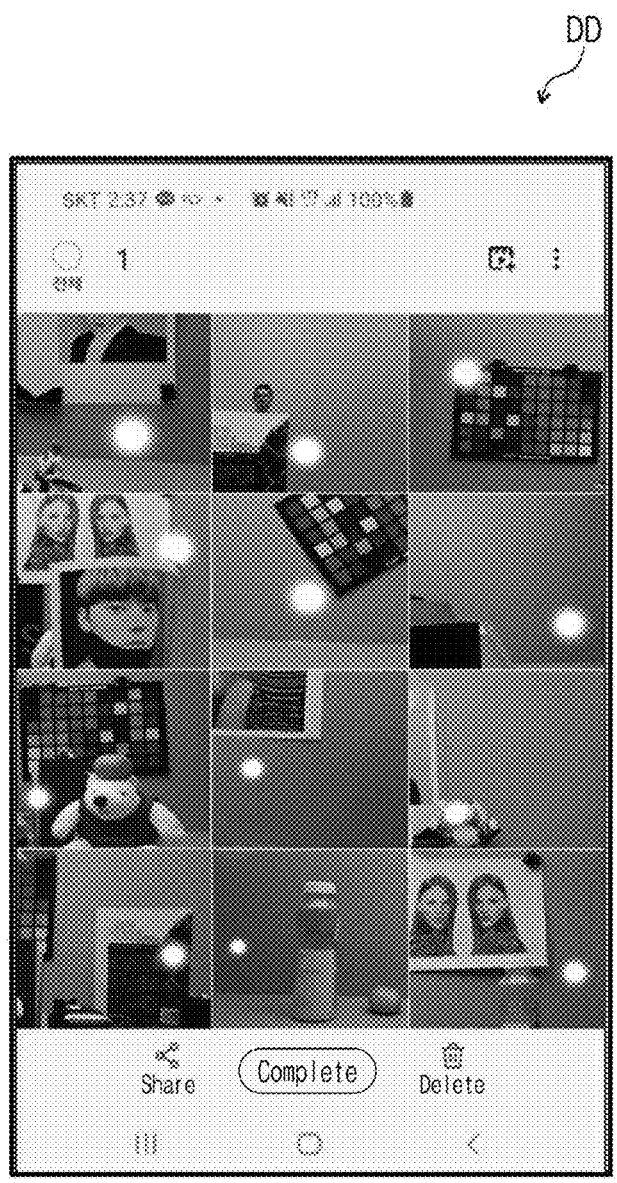

FIGS. 9A to 9C are diagrams illustrating a compensation application execution process according to some embodiments of the present disclosure.

Referring to FIGS. 8A and 9A, when the camera shooting application is executed in a state in which the compensation application AP is deactivated (RIA OFF), the raw image may be displayed on the preview screen PVS for showing an image being photographed by the camera module CMM (refer to FIG. 2). The light blur phenomenon may appear in the raw image. A status message SM2 of "RIA OFF" may be displayed on the preview screen PVS. Accordingly, the user may visually confirm that the compensation application AP is in a deactivated state through this status message SM2.

Thereafter, when the compensation application AP is executed (i.e., activated) as illustrated in FIG. 9B, a target to be compensated (raw image to be compensated) may be selected from among photos stored in the gallery. To execute the compensation operation on the selected raw images, the user may click an "RIA execution" button BTN or icon to provide an execution input signal. Then, the selected raw images may be transmitted to the compensation program of the compensation application AP. The compensation program may compensate the raw image signals to output compensation image signals. When compensation is completed, the display panel 210 may display compensation images for the selected raw images on the screen as illustrated in FIG. 9C. The compensation images may be stored in the gallery.

In the above, although the compensation process for the photo is described in FIGS. 5 to 9C, embodiments according to the present disclosure are not limited thereto. That is, the compensation for the video may be similarly applied through the compensation module CB or the compensation application AP.

Figure 10A:
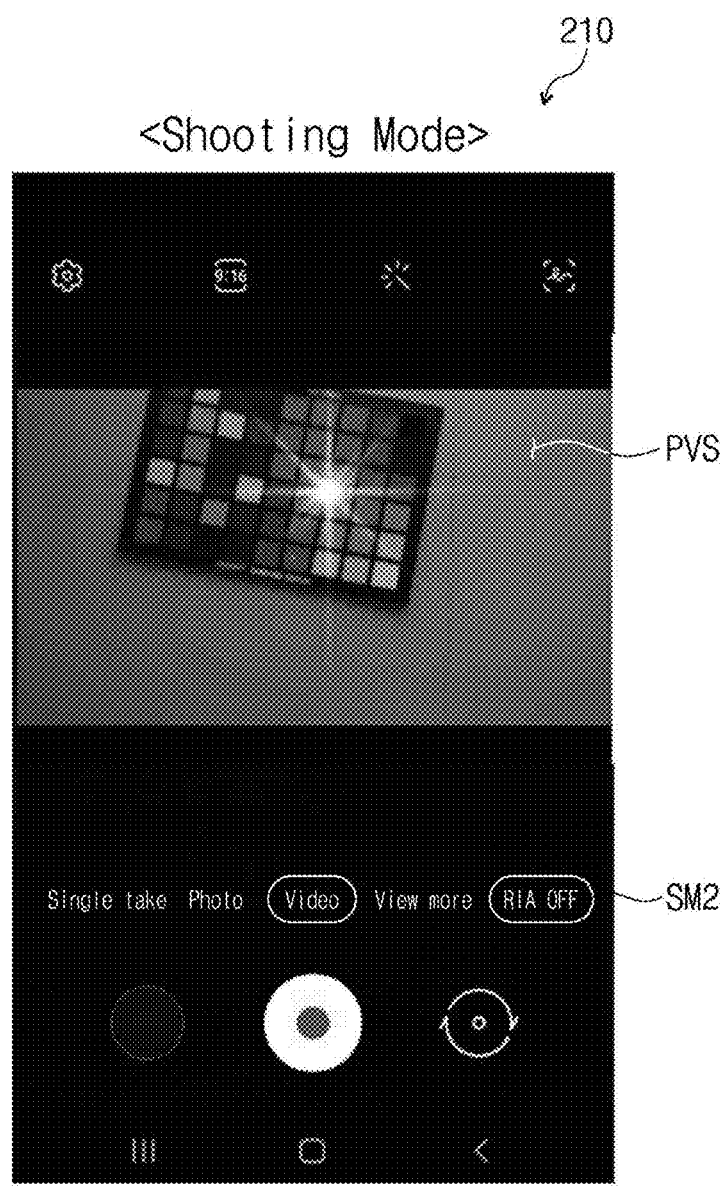
FIGS. 10A to 10C are diagrams illustrating a video compensation process through a compensation application according to some embodiments of the present disclosure.
Figure 10B:
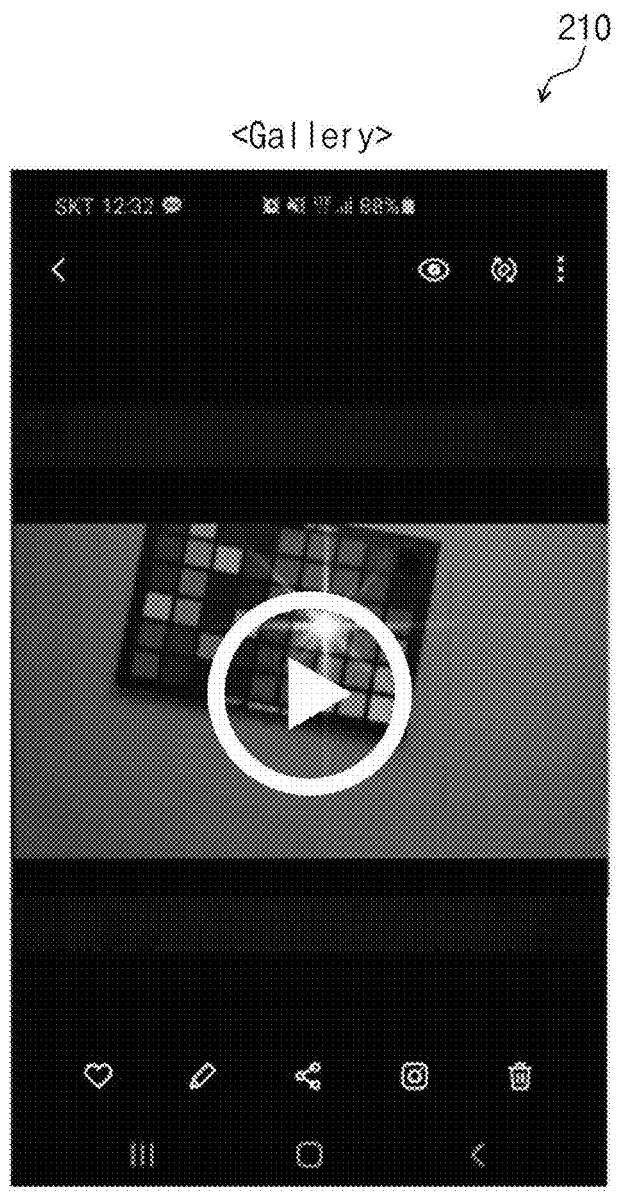
Figure 10C:
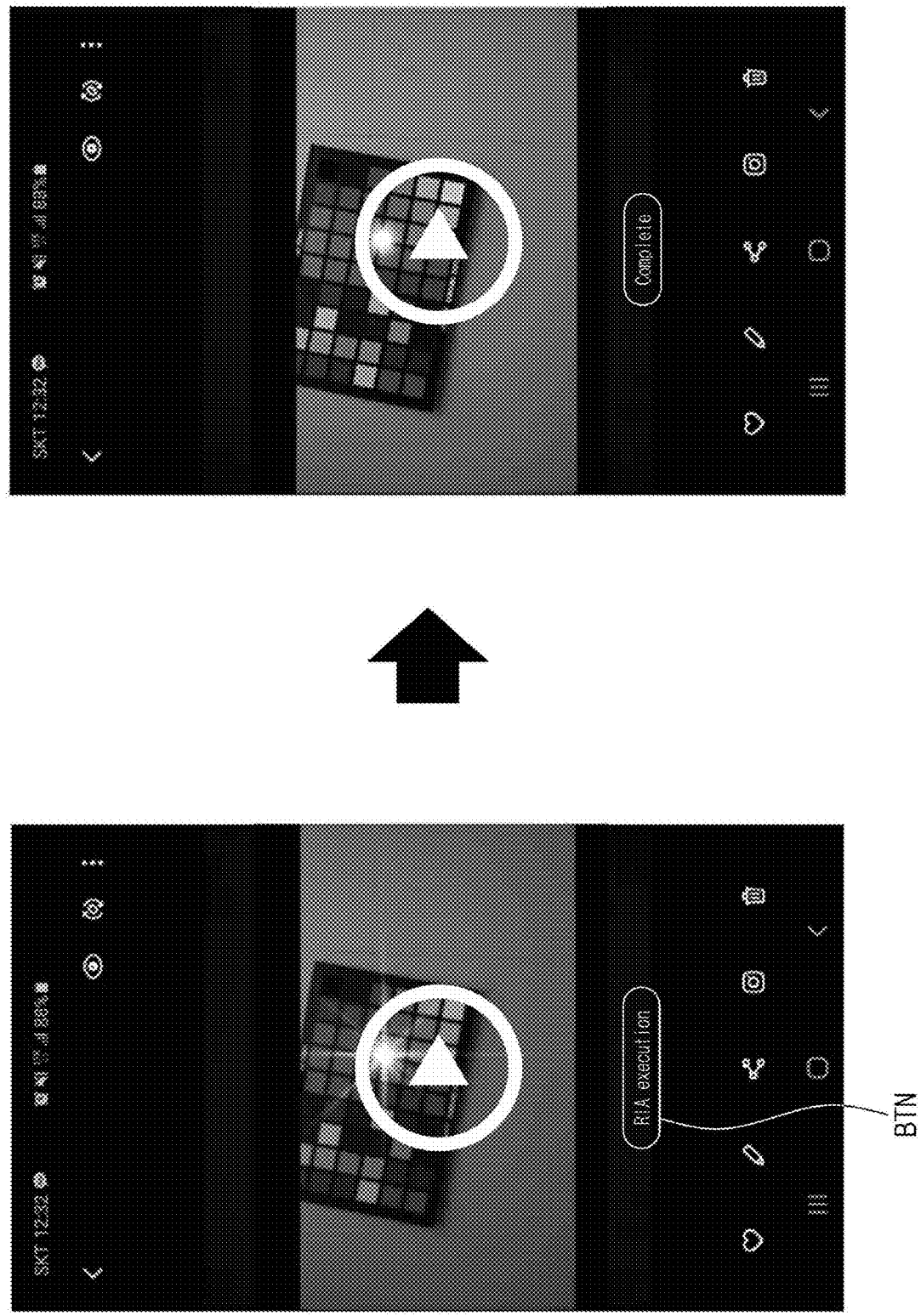
Figure 10D:
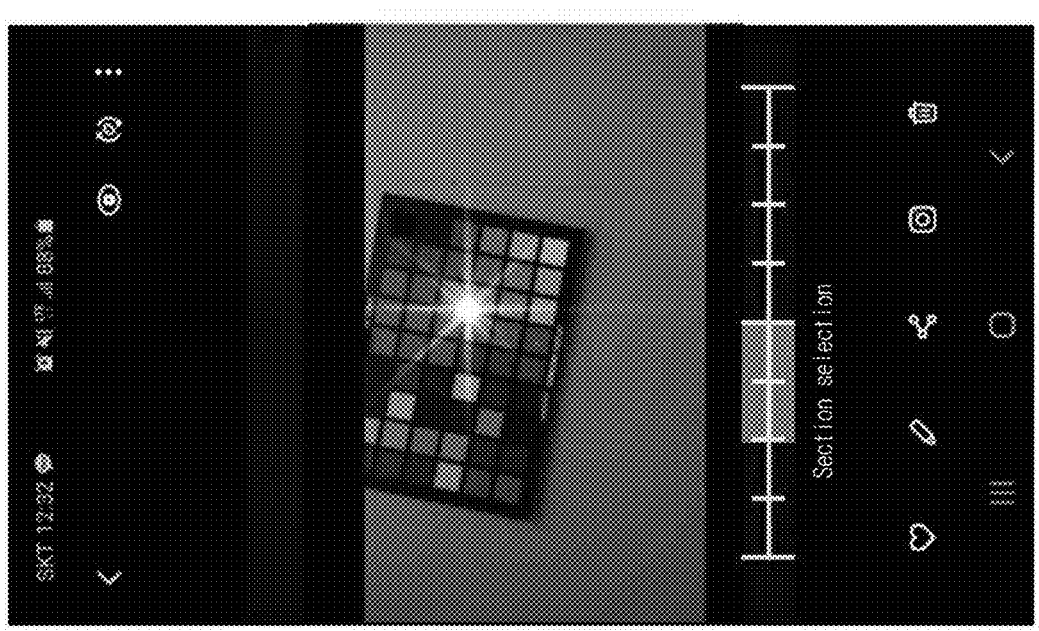
FIG. 10D is a diagram illustrating a section compensation process of a video through a compensation application according to some embodiments of the present disclosure.
Figure 10D:
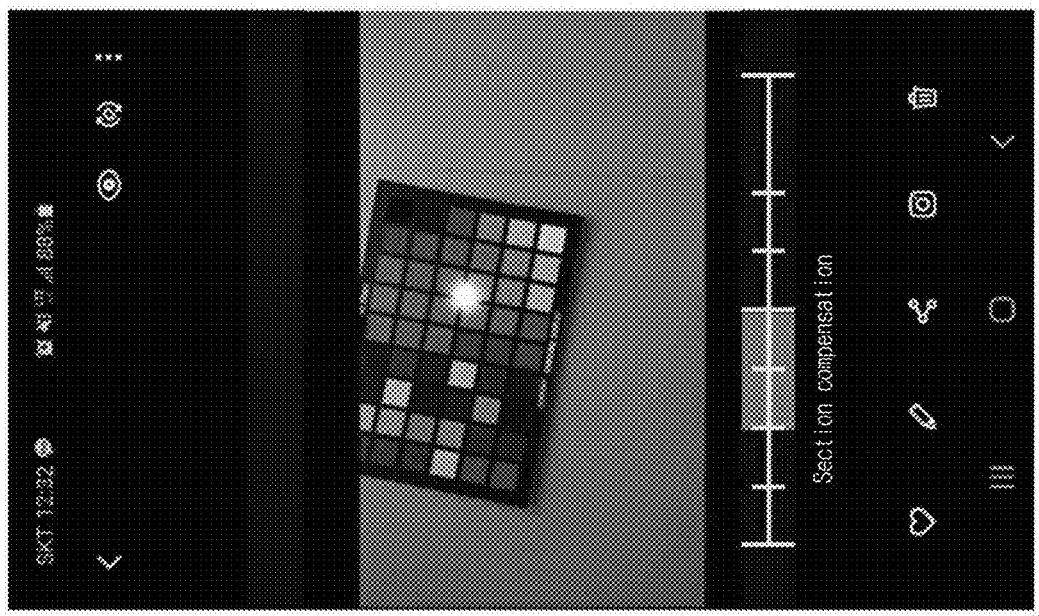

FIGS. 10A to 10C are diagrams illustrating a video compensation process through a compensation application according to some embodiments of the present disclosure, and FIG. 10D is a diagram illustrating a section compensation process of a video through a compensation application according to some embodiments of the present disclosure.

As illustrated in FIGS. 8A and 10A, when video shooting is executed in a state in which the compensation application AP is deactivated, a raw image may be displayed on the preview screen PVS for showing an image being photographed by the camera module CMM (refer to FIG. 2). The light blur phenomenon may appear in the raw image. Also, the status message SM2 of "RIA OFF" may be displayed on the preview screen PVS. Accordingly, the user may visually confirm that the compensation application AP is in the deactivation state through this status message SM2.

When the shooting operation is completed in a state in which the compensation application AP is deactivated, a raw video may be stored in the gallery as illustrated in FIG. 10B. The raw video may include raw images in which the light blur phenomenon is occurred.

Thereafter, when the compensation application AP is executed, a raw video to be compensated may be selected from among videos stored in the gallery as illustrated in FIG. 10C. The "RIA execution" button BTN may be clicked or selected to execute the compensation operation (or to generate a compensation execution input signal to trigger the compensation operation) with respect to the selected raw video. Then, the selected raw video may be transmitted to the compensation program of the compensation application AP. The compensation program may compensate the raw video signal corresponding to the raw video and may output the compensation video signals. When the compensation is completed, the display panel 210 may display the compensation video for the selected raw video on the screen as illustrated in FIG. 10C. The compensation video may be stored in the gallery.

Meanwhile, referring to FIG. 10D, the user may select a portion of the raw video to be compensated. A raw video signal corresponding to a partial section of the selected raw video may be transmitted to the compensation program of the compensation application AP. Accordingly, the compensation program executes a section compensation operation for the partial section of the selected raw video. When the section compensation is completed, the display panel 210 may display a compensation video for the selected raw video on the screen as illustrated in FIG. 10D. In this case, the compensation video may be a video in which the raw video and the section compensation video are synthesized. The compensation video may be stored in the gallery.

Figure 11A:
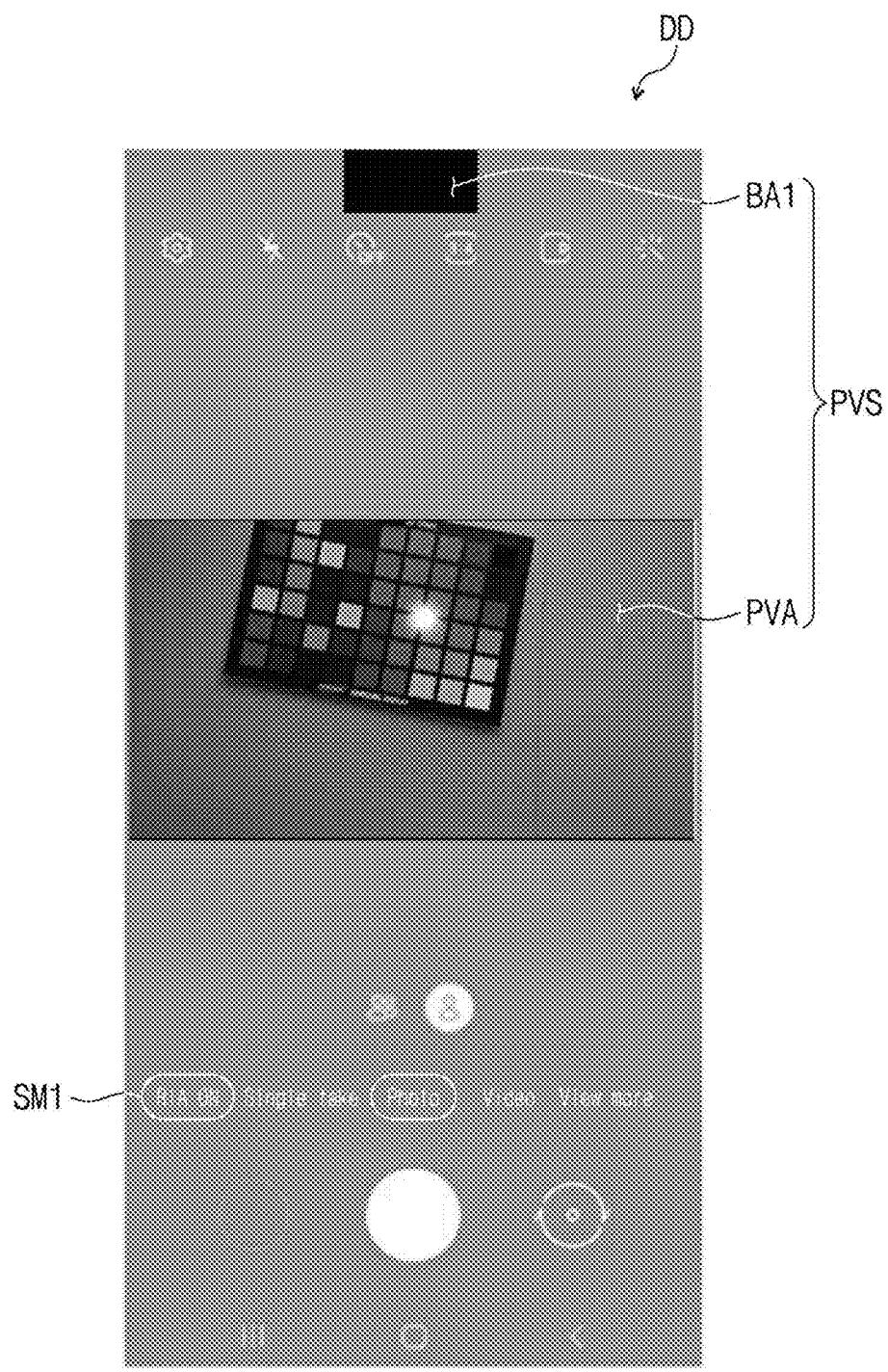
FIGS. 11A and 11B are diagrams illustrating a front shooting state according to some embodiments of the present disclosure.
Figure 11B:
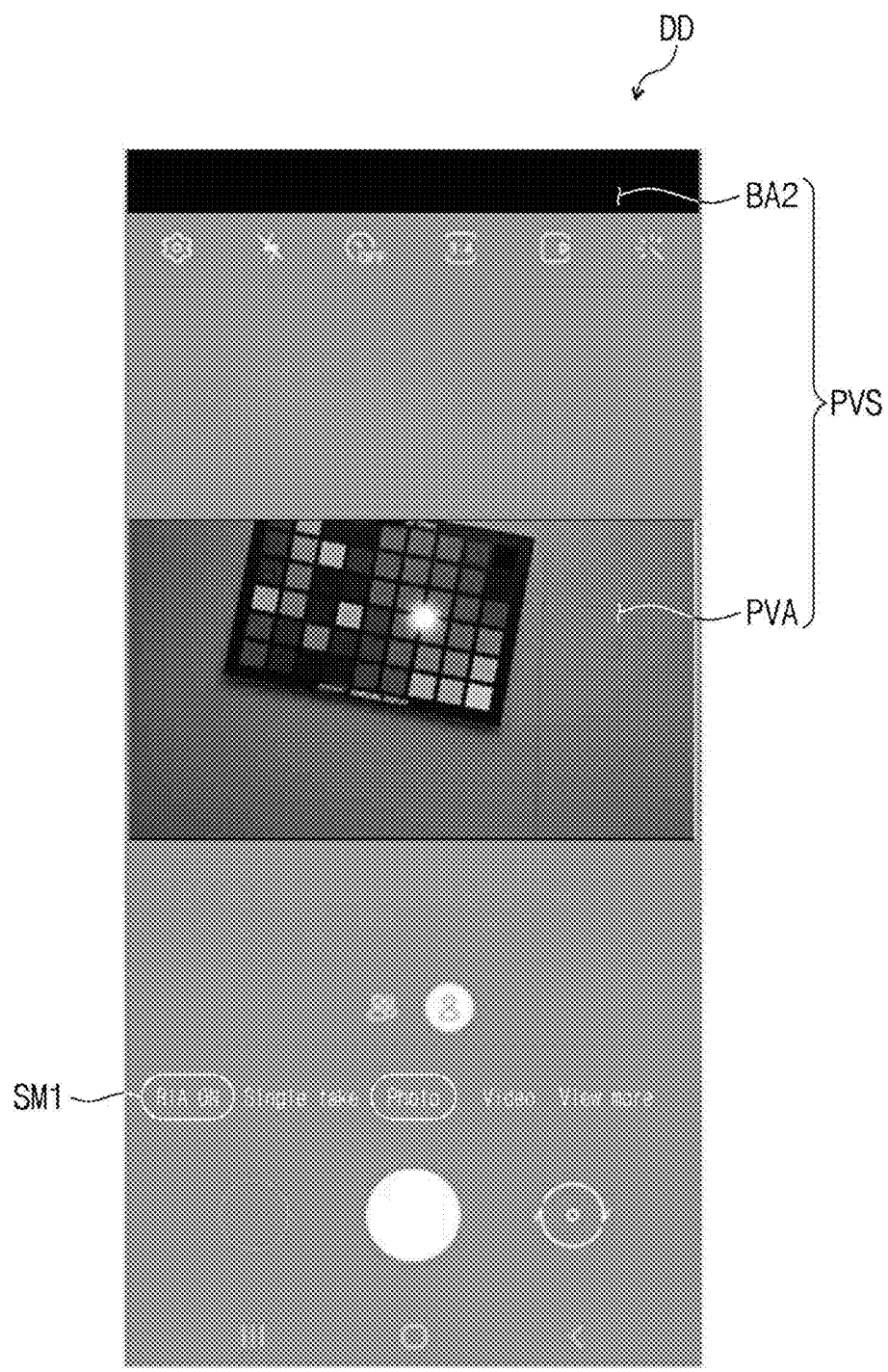

FIGS. 11A and 11B are diagrams illustrating a front shooting state according to some embodiments of the present disclosure.

Referring to FIG. 11A, when the front shooting operation of the camera module CMM (refer to FIG. 2) is executed, the preview screen PVS for showing an image before shooting of the camera module CMM to the user in advance may be displayed on the display panel 210.

The preview screen PVS may include a preview area PVA in which a preview image is displayed. As an example of the present disclosure, the preview area PVA may correspond to the first display area DA1 illustrated in FIG. 3A. The preview screen may further include a black area BA1 that does not overlap the preview area PVA. The black area BA1 may correspond to the second display area DA2 illustrated in FIG. 3A. As an example of the present disclosure, when the shooting operation of the camera module CMM is executed, the black area BA1 may enter a turn-off state in which no image is displayed. Accordingly, the black area BA1 may provide a black screen. As an example of the present disclosure, the black area BA1 may display a black grayscale image.

In FIG. 11B, the preview screen PVS may further include a black area BA2 adjacent to the preview area PVA. In this case, the second display area DA2 (refer to FIG. 3A) may be included in the black area BA2. That is, the black area BA2 may have a larger size than the second area. When the shooting operation of the camera module CMM is executed, the entire black area BA2 may enter the turn-off state in which no image is displayed. Accordingly, the entire black area BA2 may provide a black screen. As an example of the present disclosure, the black area BA2 may display a black grayscale image.

However, the positions of the black areas BA1 and BA2 are not limited thereto. For example, when the second display area DA2 is positioned at the lower end of the display panel 210, the positions of the black areas BA1 and BA2 may also move toward the lower end to include the second display area DA2. In addition, although a structure in which one black area BA1 and BA2 is provided is illustrated in FIGS. 11A to 11B, embodiments according to the present disclosure are not limited thereto. For example, when a plurality of second display areas DA2 are provided on the display panel 210, a plurality of black areas BA1 and BA2 may also be provided.

As such, the second pixels PX2 (refer to FIG. 3A) positioned in the second display area DA2 may be turned off or may display a black grayscale image. Accordingly, the light generated from the second pixels PX2 may be incident on the front camera module to prevent or reduce the inclusion of noise in the captured image.

Figure 12:
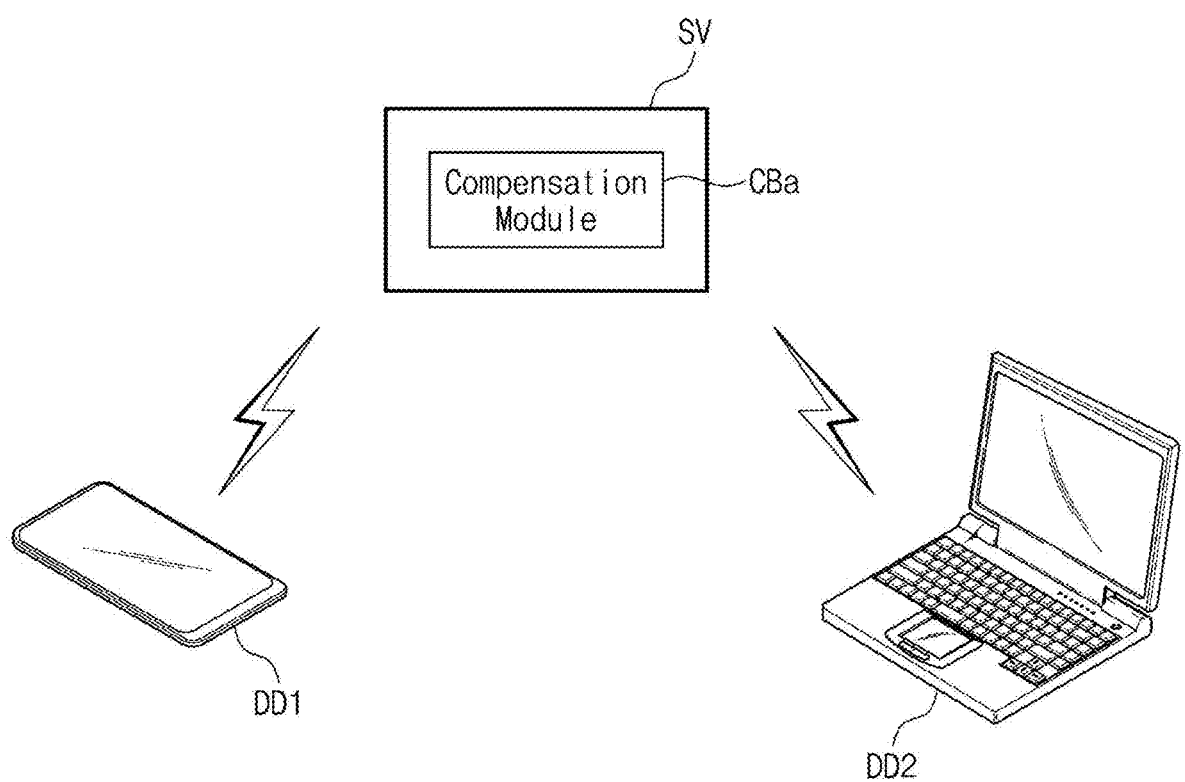
FIG. 12 is a block diagram illustrating a state in which a plurality of display devices are connected to a server through a network according to some embodiments of the present disclosure.
Figure 13:
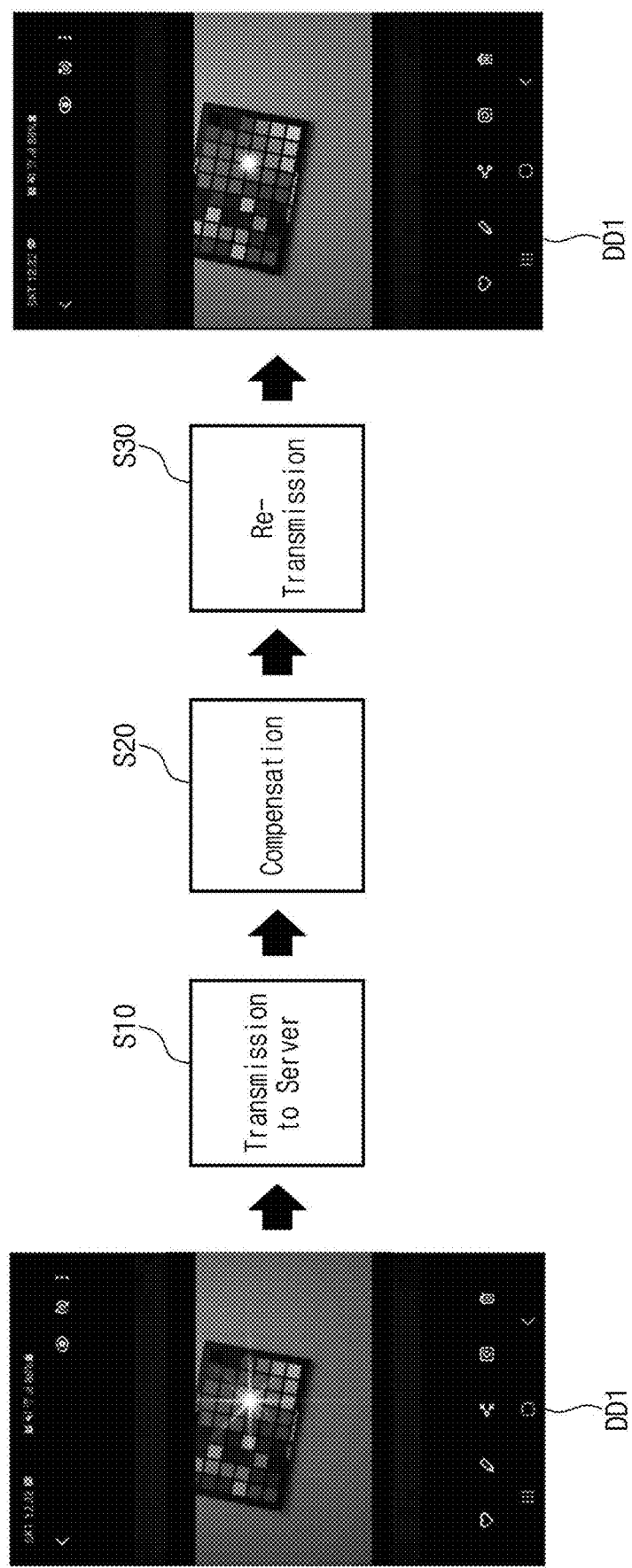
FIG. 13 is a diagram describing a restoration process through a server according to some embodiments of the present disclosure.

FIG. 12 is a block diagram illustrating a state in which a plurality of display devices are connected to a server through a network according to some embodiments of the present disclosure, and FIG. 13 is a diagram describing a restoration process through a server according to some embodiments of the present disclosure.

Referring to FIGS. 12 and 13, a plurality of display devices DD1 and DD2 may be connected to a server SV through a network. As an example of the present disclosure, each of the plurality of display devices DD1 and DD2 may be applied to an electronic device such as a smart phone, a notebook computer, a tablet, a computer, a smart television, etc. At least one of the plurality of display devices DD1 or DD2 may include the display panel 210 including the first display area DA1 and the second display area DA2 illustrated in FIG. 3A, and the camera module CMM (refer to FIG. 2) located under the second display area DA2.

The plurality of display devices DD1 and DD2 may communicate with the server SV through the network. The network may be a wired or wireless network. The wireless network may be a short-range wireless network or a long-range wireless network. Each of the plurality of display devices DD1 and DD2 may transmit a raw image to be compensated to the server SV through a network.

The server SV may include a compensation module CBa. The compensation module CBa provided in the server SV may have a configuration similar to the compensation module CB illustrated in FIG. 5. Accordingly, additional descriptions of the compensation module CBa will be omitted to avoid redundancy. The compensation module CB illustrated in FIG. 5 may not be embedded in each of the plurality of display devices DD1 and DD2 connected to the server SV. Accordingly, each of the plurality of display devices DD1 and DD2 may access the server SV for raw image compensation. Hereinafter, one of the plurality of display devices DD1 and DD2 will be referred to as the first display device DD1, and the other one will be referred to as the second display device DD2.

Referring to FIG. 13, after selecting a raw image to be compensated, the first display device DD1 may transmit a raw image signal for the selected raw image to the server (S10). The first display device DD1 may transmit parameter information necessary for compensation together with the raw image signal to the server SV. However, embodiments according to the present disclosure are not limited thereto. That is, the first display device DD1 may not transmit the parameter information to the server SV. In this case, the server SV may pre-store the parameter information for each of the plurality of display devices DD1 and DD2.

The server SV receives the raw image signal from the first display device DD1 and compensates for the received raw image signal (S20). That is, the compensation module CBa of the server SV may generate the compensation image signal by compensating the raw image signal using the compensation program utilizing deep learning based on learning data. The server SV may retransmit the generated compensation image signal back to the first display device DD1 (S30). Accordingly, the first display device DD1 may display the compensation image based on the compensation image signal.

As such, even if the compensation module CB (refer to FIG. 2) is not embedded or the compensation application AP (refer to FIG. 8A) is not installed in each of the plurality of display devices DD1 and DD2, each of the plurality of display devices DD1 and DD2 may compensate for a desired image by accessing the server SV.

FIGS. 14A to 14D are diagrams illustrating a screen compensation process when a video conference application is executed, according to some embodiments of the present disclosure.

Referring to FIGS. 12 and 14A to 14D, the compensation module CB (refer to FIG. 5) according to some embodiments of the present disclosure is not embedded in the first display device DD1. A video conference application VC_AP may be installed in the first display device DD1.

Figure 14A:
FIGS. 14A to 14D are diagrams illustrating a screen compensation process when a video conference application is executed, according to some embodiments of the present disclosure.
Figure 14B:
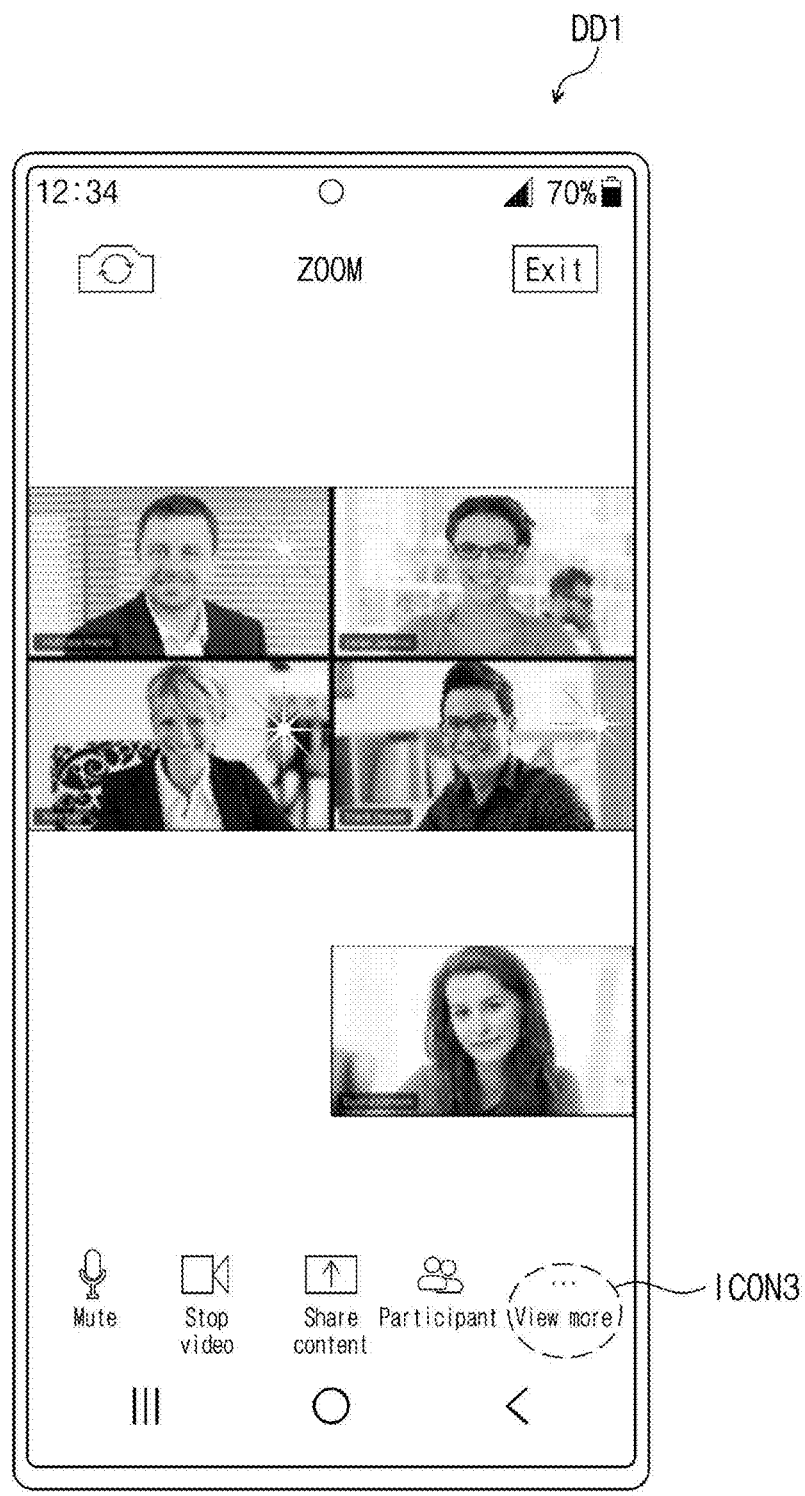

When the video conference application VC_AP is activated, as illustrated in FIG. 14B, images of conference participants connected to the video conference and user's own image are displayed on the screen of the first display device DD1. In this case, the light blur phenomenon may occur in the images of some conference participants. In this case, the user may select a compensation mode entry button (or icon) to compensate for the image in which the light blur phenomenon is occurred.

Figure 14C:

For example, as illustrated in FIG. 14B, the user may select a "View More" icon ICON3 at a bottom of the screen. Then, icons supporting various functions may be displayed on the screen as illustrated in FIG. 14C. In this case, when the user clicks a "RIA ON" icon, the first display device DD1 may transmit a determination to activate the compensation program to the server SV.

Figure 14D:
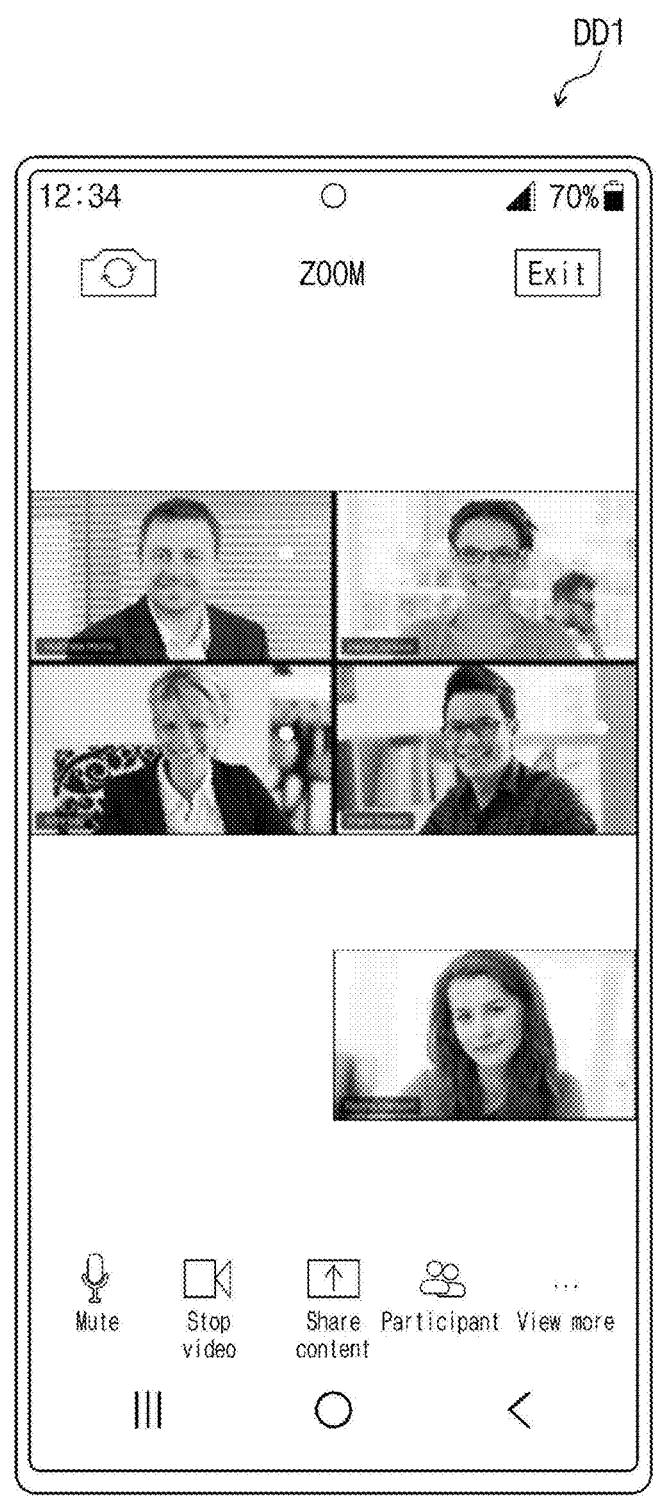

The server SV supporting the video conference application VC_AP may provide the compensation image to the first display device DD1 that transmits the activation determination. Accordingly, as illustrated in FIG. 14D, the compensation image from which the light blur phenomenon is removed may be displayed on the screen displayed in the first display device DD1.

FIGS. 14A to 14B illustrate a process in which the user of the first display device DD1 decides to enter the compensation, but the present disclosure is not limited thereto. For example, the server SV supporting the video conference application may always activate the compensation program. That is, in this case, the server SV may always transmit the compensation image to the display devices DD1 and DD2 connected to the server SV through the video conference application.

Figure 15:
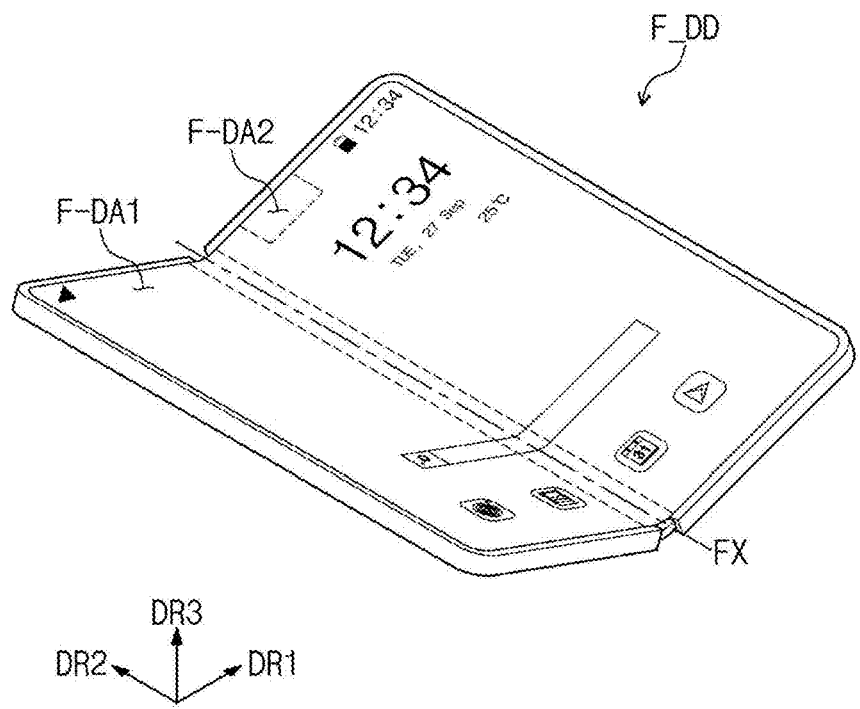
FIGS. 15 and 16 are perspective views illustrating a display device according to some embodiments of the present disclosure.
Figure 16:
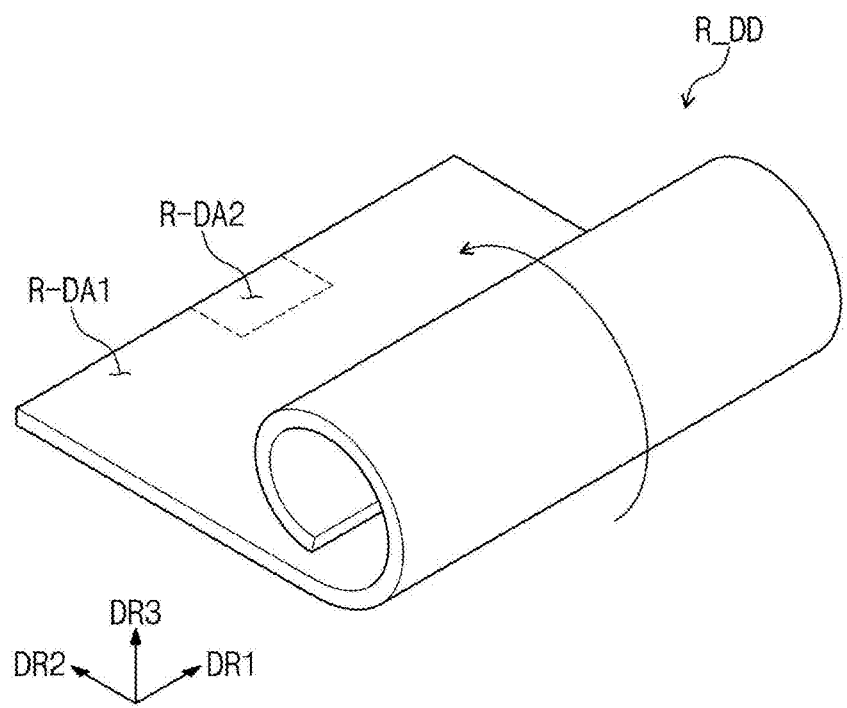

FIGS. 15 and 16 are perspective views illustrating a display device according to some embodiments of the present disclosure.

Referring to FIG. 15, a display device F_DD according to some embodiments of the present disclosure may be a foldable display device. The display device F_DD may be folded based on a folding axis FX extending along the second direction DR2. The display device F_DD may include a first display area F-DA1 and a second display area F-DA2. The first and second display areas F-DA1 and F-DA2 have a structure similar to that of the first and second display areas DA1 and DA2 illustrated in FIGS. 1B and 3A. The lower electronic module 500 (refer to FIG. 1B), for example, the camera module CMM (refer to FIG. 2) may be located under the second display area F-DA2. The position, size, and shape of the second display area F-DA2 may be variously modified.

The display device F_DD may include the compensation module CB illustrated in FIG. 5 or may be a display device in which the compensation application AP illustrated in FIG. 8A is installed. In addition, the display device F_DD may be one of the display devices DD1 and DD2 connectable to the server SV illustrated in FIG. 12. Accordingly, the display device F_DD may perform the compensation process illustrated in FIGS. 5 to 14B.

FIG. 15 illustrates an example of a foldable display device, but the shape of the foldable display device is not limited thereto. For example, the display device F_DD may be folded based on a folding axis extending along the first direction DR1 or may be folded along two or more folding axes.

Referring to FIG. 16, a display device R_DD according to some embodiments may be a rollable display device. The display device R_DD may be rolled along the second direction DR2. The display device R_DD may include a first display area R-DA1 and a second display area R-DA2. The first and second display areas R-DA1 and R-DA2 have a structure similar to that of the first and second display areas DA1 and DA2 illustrated in FIGS. 1B and 3A. The lower electronic module 500 (refer to FIG. 1B), for example, the camera module CMM (refer to FIG. 2) may be located under the second display area R-DA2. The position, size, and shape of the second display area R-DA2 may be variously modified.

The display device R_DD may include the compensation module CB illustrated in FIG. 5 or may be a display device in which the compensation application AP illustrated in FIG. 8A is installed. Also, the display device R_DD may be one of the display devices DD1 and DD2 connectable to the server SV illustrated in FIG. 12. Accordingly, the display device R_DD may perform the compensation process illustrated in FIGS. 5 to 14B.

Although an example of the rollable display device is illustrated in FIG. 16, the shape of the rollable display device is not limited thereto. For example, the display device R_DD may be rolled along the first direction DR1.

According to some embodiments of the present disclosure, the display device may compensate for the raw image displayed on the display panel before and after a camera shooting by including a compensation module or executing a compensation application. Accordingly, it may be possible to improve the quality of an image during or after the camera shooting, which is deteriorated due to the light blur phenomenon occurring when a camera module is located under the second display area.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments according to the present invention.

While aspects of some embodiments of the present disclosure has been described, it will be apparent to those of ordinary skill in the art that various changes and modifications may be made thereto without departing from the spirit and scope of embodiments according to the present disclosure as set forth in the following claims, and their equivalents.

What is claimed is:

1. A display device comprising:
a display panel including a first display area having a first light transmittance and a second display area having a second light transmittance that is higher than the first light transmittance;
a camera module under the second display area that is configured to output a raw image signal;
a compensation module configured to:
receive the raw image signal; and
compensate, in response to a user input setting signal input by a user, the raw image signal through a compensation program utilizing a learning data-based deep learning algorithm to generate a compensation image signal; and
a control module configured to control one or more operations of the display panel, the camera module, and the compensation module,
wherein the compensation module comprises:
a parameter storage unit storing a parameter including information on the second display area;
a point spread function detection unit generating a point spread function based on the parameter;
a prediction image generation unit predicting and generating a flare image of a target image by using the point spread function;
a learning data output unit generating learning data by using the target image and the flare image; and
an image compensation unit receiving the raw image signal from the camera module and compensating the raw image signal using the learning data to generate the compensation image signal.

2. The display device of claim 1,
wherein, in response to the user input setting signal being input to the display device, the display device is configured to enter a compensation mode in which the compensation module is activated.

3. The display device of claim 2, wherein the display panel is configured to display a user interface to enable the user to provide the user input setting signal.

4. The display device of claim 1, wherein, in a compensation mode in which the compensation module is activated, in response to a shooting mode in which the camera module operates being executed,
the display panel is configured to display a compensation image based on the compensation image signal on a preview screen that is previewed to the user before shooting.

5. The display device of claim 4, wherein a status message indicating that the compensation mode is activated is further displayed on the preview screen.

6. The display device of claim 1, wherein, in a compensation mode in which the compensation module is activated, the display device is configured to receive a user selection of at least one raw image to be compensated from among pre-stored raw images, and to receive a compensation execution input.

7. The display device of claim 6, wherein a compensation control signal to activate the compensation module is activated by the compensation execution input, and
wherein the compensation module is configured to receive an image signal associated with the selected at least one raw image as the raw image signal.

8. The display device of claim 1, wherein, in a compensation mode in which the compensation module is activated, the display device is configured to receive a user selection of at least one video to be compensated from among pre-stored videos, and to receive a compensation execution input.

9. The display device of claim 8, wherein a compensation control signal to activate the compensation module is activated by the compensation execution input, and
wherein the compensation module is configured to receive an image signal associated with the selected at least one video as the raw image signal.

10. The display device of claim 8, wherein, in the compensation mode in which the compensation module is activated, the display device is configured to receive a user selection of a partial section to be compensated among all sections in which the at least one video is executed.

11. The display device of claim 10, wherein the compensation module is configured to receive an image signal associated with the selected partial section as the raw image signal.

12. The display device of claim 1, wherein, in response to a shooting mode in which the camera module operates being executed,
the display panel is configured to display a preview screen displaying a preview image before shooting of the camera module to the user in advance, and
wherein the preview screen includes a preview area and a black area adjacent to the preview area.

13. The display device of claim 12, wherein the black area enters a turn-off state in which no images are displayed.

14. The display device of claim 13, wherein the black area includes at least the second display area.

15. The display device of claim 1, wherein the second display area is provided in plurality.

16. A method of driving a display device,
the display device comprising:
a display panel having a first display area having a first light transmittance and a second display area having a second light transmittance that is higher than the first light transmittance; and
a camera module under the second display area and configured to output a raw image signal, the method comprising:
activating a compensation application in which a compensation program is stored;
providing the raw image signal to the activated compensation application;
generating, in response to a user input setting signal input by a user, a compensation image signal by compensating the raw image signal through the compensation program utilizing a learning data-based deep learning algorithm in the compensation application; and
displaying a compensation image corresponding to the compensation image signal on the display panel,
wherein the generating the compensation image signal comprises:
storing a parameter including information on the second display area;
generating a point spread function based on the parameter;
predicting and generating a flare image of a target image by using the point spread function;
generating learning data by using the target image and the flare image;
receiving the raw image signal from the camera module; and
compensating the raw image signal using the learning data to generate the compensation image signal.

17. The method of claim 16, wherein, in a compensation mode in which the compensation application is activated, in response to a shooting mode in which the camera module operates being executed,
displaying, by the display panel, the compensation image on a preview screen.

18. The method of claim 17, further comprising displaying a status message indicating that the compensation mode is activated on the preview screen.

19. The method of claim 16, wherein, in a compensation mode in which the compensation application is activated, receiving a user selection of at least one raw image to be compensated from among pre-stored raw images, and receiving a compensation execution input to activate the compensation program.

20. A method of driving a display device,
the display device comprising:
a display panel including a first display area having a first light transmittance and a second display area having a second light transmittance higher than the first light transmittance; and
a camera module under the second display area and configured to output a raw image signal, the method comprising:
transmitting the raw image signal to a server through a network;
receiving, from the server, a compensation image signal generated, in response to a user input setting signal input by a user, by compensating the raw image signal through a compensation program utilizing a learning data-based deep learning algorithm; and
displaying a compensation image corresponding to the compensation image signal on the display panel,
wherein the generating the compensation image signal comprises:
storing a parameter including information on the second display area;
generating a point spread function based on the parameter;
predicting and generating a flare image of a target image by using the point spread function;
generating learning data by using the target image and the flare image;
receiving the raw image signal from the camera module; and
compensating the raw image signal using the learning data to generate the compensation image signal.

21. The method of claim 20, further comprising selecting, by the display device, at least one raw image to be compensated from among pre-stored raw images, and transmitting an image signal corresponding to the selected raw image as the raw image signal to the server.

22. The method of claim 20, wherein the server is a server supporting a video conference application.

23. The method of claim 22, further comprising:
before transmitting the raw image signal to the server,
executing the video conference application supporting a video conference; and
transmitting a determination to activate the compensation program to the server.

24. An electronic device comprising:
a display panel including a first display area having a first light transmittance and a second display area having a second light transmittance that is higher than the first light transmittance;
a camera module under the second display area that is configured to output a raw image signal;
a compensation module configured to:
  receive the raw image signal; and
  compensate, in response to a user input setting signal input by a user, the raw image signal through a compensation program utilizing a learning data-based deep learning algorithm to generate a compensation image signal;
a control module configured to control one or more operations of the display panel, the camera module, and the compensation module; and
a housing accommodating the display panel and camera module,
wherein the compensation module comprises:
a parameter storage unit storing a parameter including information on the second display area;
a point spread function detection unit generating a point spread function based on the parameter;
a prediction image generation unit predicting and generating a flare image of a target image by using the point spread function;
a learning data output unit generating learning data by using the target image and the flare image; and
an image compensation unit receiving the raw image signal from the camera module and compensating the raw image signal using the learning data to generate the compensation image signal.

* * * * *